US009494432B2

(12) United States Patent
Pakzad et al.

(10) Patent No.: US 9,494,432 B2
(45) Date of Patent: Nov. 15, 2016

(54) COLLABORATIVE NAVIGATION TECHNIQUES FOR MOBILE DEVICES

(75) Inventors: Payam Pakzad, Mountain View, CA (US); Sameera Poduri, Santa Clara, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 13/569,624

(22) Filed: Aug. 8, 2012

(65) Prior Publication Data

US 2013/0335273 A1  Dec. 19, 2013

Related U.S. Application Data

(60) Provisional application No. 61/661,758, filed on Jun. 19, 2012.

(51) Int. Cl.
*G01S 5/02* (2010.01)
*G01C 21/20* (2006.01)
*H04W 4/02* (2009.01)
*G01S 5/00* (2006.01)

(52) U.S. Cl.
CPC .......... *G01C 21/206* (2013.01); *G01S 5/0072* (2013.01); *G01S 5/0284* (2013.01); *G01S 5/0289* (2013.01); *H04W 4/023* (2013.01); *H04W 4/025* (2013.01)

(58) Field of Classification Search
CPC .................. G01S 5/0284; G01S 5/0289; G01S 5/0072; H04W 4/023; H04W 4/025; H04W 64/00; G01C 21/206
See application file for complete search history.

(56) References Cited

U.S. PATENT DOCUMENTS

| 6,816,782 | B1 * | 11/2004 | Walters et al. ............... 701/426 |
| 7,047,022 | B2 * | 5/2006 | Aoyama .................... 455/456.6 |
| 7,084,809 | B2 * | 8/2006 | Hockley et al. ......... 342/357.48 |
| 7,167,715 | B2 * | 1/2007 | Stanforth ...................... 455/457 |
| 7,911,382 | B2 * | 3/2011 | Liu et al. ................. 342/357.64 |
| 7,952,522 | B2 | 5/2011 | Hohl |
| 2002/0122003 | A1 | 9/2002 | Patwari et al. |

(Continued)

FOREIGN PATENT DOCUMENTS

| WO | WO 0157547 A1 * | 8/2001 | ............ H04W 64/00 |
| WO | WO 0158098 A2 * | 8/2001 | ............ H04W 64/00 |

OTHER PUBLICATIONS

International Search Report and Written Opinion—PCT/US2013/045288—ISA/EPO—Oct. 28, 2013.

*Primary Examiner* — Gregory C Issing
(74) *Attorney, Agent, or Firm* — Berkeley Law & Technology Group, LLP

(57) ABSTRACT

Various methods, apparatuses and/or articles of manufacture are provided which may be implemented to perform and/or otherwise support collaborative navigation between a plurality of mobile devices. In one example, a first mobile device, in response to a determination that at least a second mobile device is located within a threshold distance of the first mobile device, may obtain a navigation parameter indicative of an initial position and/or movement of the second mobile device which was determined based, at least in part, on a measurement from a sensor at the second mobile device. The first mobile device then affect a determined position and/or movement of the first mobile device based, at least in part, on the navigation parameter.

93 Claims, 8 Drawing Sheets

(56) References Cited

U.S. PATENT DOCUMENTS

| | | |
|---|---|---|
| 2003/0216865 A1* | 11/2003 | Riewe et al. ................. 701/220 |
| 2005/0227707 A1 | 10/2005 | Law et al. |
| 2006/0276205 A1 | 12/2006 | Bengtsson |
| 2007/0109185 A1* | 5/2007 | Kracke et al. ........... 342/357.09 |
| 2007/0225016 A1* | 9/2007 | Jendbro et al. ............ 455/456.1 |
| 2007/0282678 A1* | 12/2007 | Dendi et al. .................... 705/14 |
| 2008/0280625 A1* | 11/2008 | Larsen ....................... 455/456.1 |
| 2009/0233551 A1 | 9/2009 | Haartsen et al. |
| 2011/0199917 A1* | 8/2011 | Karaoguz et al. ........... 370/252 |
| 2012/0013468 A1 | 1/2012 | Olah |
| 2012/0044265 A1 | 2/2012 | Khorashadi et al. |

\* cited by examiner

US 9,494,432 B2

COLLABORATIVE NAVIGATION TECHNIQUES FOR MOBILE DEVICES

CLAIM OF PRIORITY UNDER 35 U.S.C. §119

This application claims priority under 35 USC 119 to U.S. Provisional Application Ser. No. 61/661,758, filed Jun. 19, 2012, and entitled, "COLLABORATIVE NAVIGATION TECHNIQUES FOR MOBILE DEVICES", which is assigned to the assignee hereof and which is incorporated herein by reference.

BACKGROUND

1. Field

The subject matter disclosed herein relates to electronic devices, and more particularly to methods, apparatuses and articles of manufacture for use in one or more electronic devices to perform and/or otherwise support certain positioning and/or other like navigation capabilities in a mobile device in collaboration with at least one other mobile device.

2. Information

Mobile devices, such as mobile phones, notebook, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signal-based positioning signals. Using high precision location information, applications for a mobile device may provide a user with various services, such as, for example, vehicle/pedestrian navigation, location-based searching, just to name a couple of examples. Here, high precision signal-based location information (e.g., obtained from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network access points, cellular network base stations, special-purpose beacon transmitters, etc., that transmit wireless signals which may be received by the mobile device and used for positioning purposes. For example, a mobile device may receive a signal-based positioning signal from a transmitter and based thereon determine a pseudorange between the transmitter and receiver. Hence, for example, positioning may be provided based on trilateration and/or other known signal-based positioning techniques.

In some implementations, an indoor navigation system may provide a digital electronic map to mobile devices as they enter a particular indoor area. Such electronic map may show indoor features such as doors, hallways, entry ways, walls, etc., points of interest such as bathrooms, pay phones, room names, stores, etc. Such electronic map may be stored at a server to be accessible by a mobile device through selection of a URL, for example. By obtaining and rendering all or part of an electronic map via a display mechanism, a mobile device may, for example, overlay a current location of the mobile device (and user) over the displayed map to provide the user with additional context.

In certain instances, in addition to an electronic map, an indoor navigation system may selectively provide assistance information to mobile devices to facilitate and/or enable various location based services. Such assistance information may include, for example, information to facilitate measurements of ranges to wireless access points at known fixed locations. In one implementation, For example, "radio heatmap" or "probability heatmap" data indicating and/or otherwise modeling expected RSSI and/or round-trip delay times associated with access points may enable a mobile device to associate signal measurements with locations in an indoor environment. Here, for example, grid points may be laid over locations in an indoor environment at uniform spacing (e.g., 0.5 meter separation of neighboring grid points), or possibly with non-uniform spacing. Thus, radio heatmap and/or other corresponding probability functions/models may be made available from a computing device (such as a server) for each grid point covering an indoor environment.

SUMMARY

In accordance with certain aspects, a method for performing collaborative navigation between a plurality of mobile devices may comprise: with a first mobile device, in response to a determination that at least a second mobile device is located within a threshold distance of the first mobile device: obtaining a navigation parameter indicative of an initial position and/or movement of the second mobile device, the initial position and/or movement of the second mobile device being determined based, at least in part, on a measurement from a sensor at the second mobile device; and affecting a determined position and/or movement of the first mobile device based, at least in part, on the navigation parameter.

In accordance with certain other aspects, an apparatus for use in a first mobile device in performing collaborative navigation between a plurality of mobile devices may comprise: in response to a determination that at least a second mobile device is located within a threshold distance of the first mobile device: means for obtaining a navigation parameter indicative of an initial position and/or movement of the second mobile device, the initial position and/or movement of the second mobile device being determined based, at least in part, on a measurement from a sensor at the second mobile device; and means for affecting a determined position and/or movement of the first mobile device based, at least in part, on the navigation parameter.

In accordance with certain further aspects, a computing platform at a first mobile device may be provided, which comprises: a communication interface; and a processing unit to: in response to a determination that at least a second mobile device is located within a threshold distance of the first mobile device: obtain, via the communication interface, a navigation parameter indicative of an initial position and/or movement of the second mobile device, the initial position and/or movement of the second mobile device being determined based, at least in part, on a measurement from a sensor at the second mobile device; and affect a determined position and/or movement of the first mobile device based, at least in part, on the navigation parameter.

In accordance with still other aspects, an article of manufacture may be provided, which comprises a non-transitory computer readable medium having stored there in computer implementable instructions executable by a processing unit in the first mobile device to: in response to a determination that at least a second mobile device is located within a threshold distance of the first mobile device: obtain a navigation parameter indicative of an initial position and/or movement of the second mobile device, the initial position and/or movement of the second mobile device being determined based, at least in part, on a measurement from a sensor at the second mobile device; and affect a determined position and/or movement of the first mobile device based, at least in part, on the navigation parameter.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
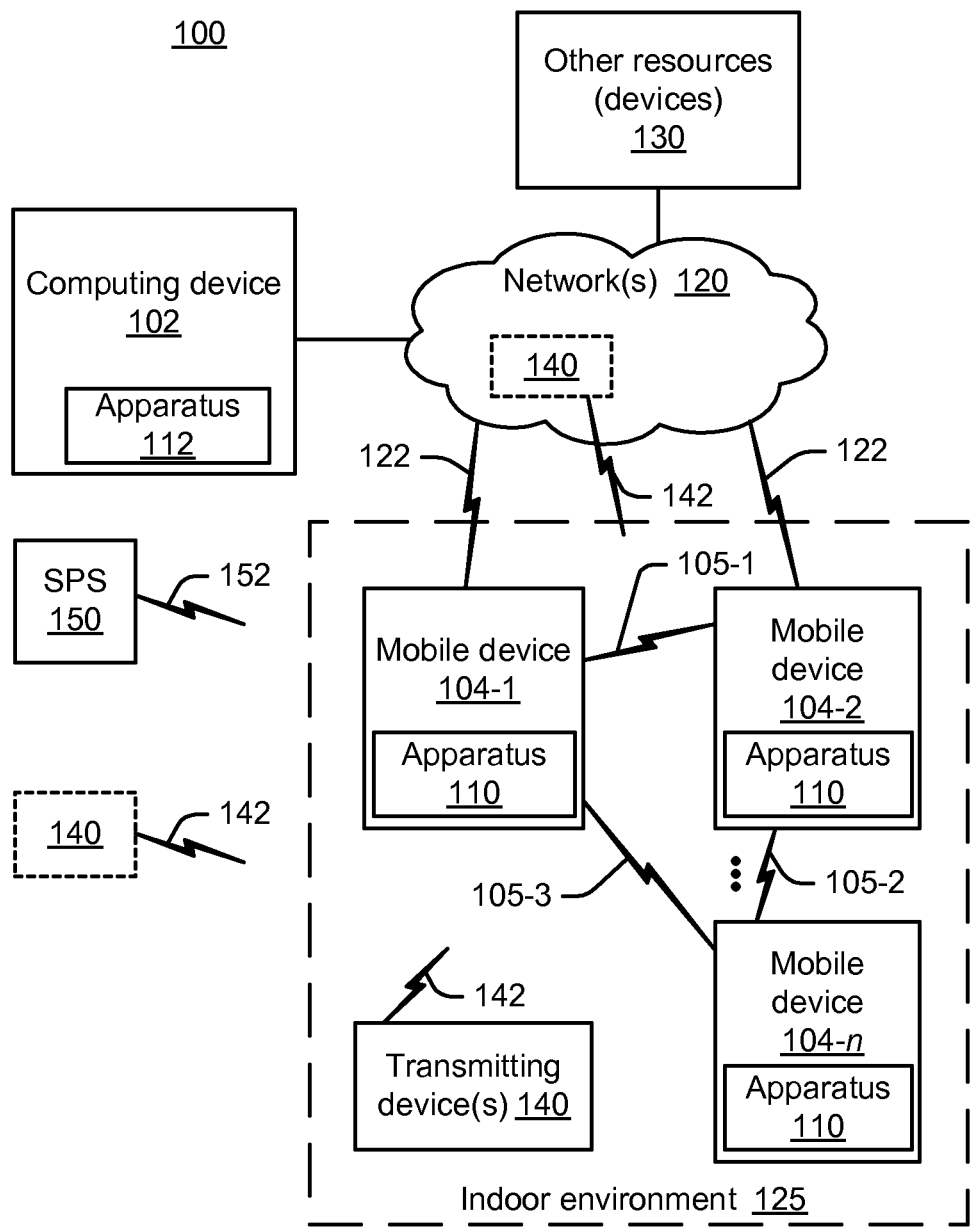
FIG. 1 is a schematic block diagram illustrating an example environment that includes representative electronic devices that may perform and/or otherwise support certain positioning and/or other like navigation capabilities in a mobile device in collaboration with at least one other mobile device, in accordance with an example implementation.

An electronic device, such as, a mobile device, may, at times, be unable to acquire a requisite number of wireless positioning signals to determine is position and/or to track its movements within an environment, such as an indoor environment and/or an "urban canyon" within certain cities. For example, in certain indoor environments and/or urban environments there may be an inadequate number of transmitting devices, such as, wireless access points, and/or their arrangement may be unsuitable for use in positioning at certain regions, and other positioning signals, such as, GPS signals may be difficult if not impossible to acquire within such settings.

The techniques provided herein allow for mobile devices to collaborate within one another with regard to certain positioning and/or navigation capabilities. Such techniques may be useful in certain settings in which wireless positioning signals may or may not be available for use.

The subject matter disclosed herein relates to electronic devices, and more particularly to methods, apparatuses and articles of manufacture for use in one or more electronic devices, such as, one or more mobile devices (e.g., portable communication devices, portable computing devices, portable machines, etc.) and/or one or more computing devices (e.g., servers, etc.), to perform and/or otherwise support certain navigation capabilities in a mobile device in collaboration with one or more other mobile devices.

For example, as described in greater detail herein, methods, apparatuses and articles of manufacture may be provided for performing collaborative navigation between a plurality of mobile devices.

Thus, for example, a first mobile device may determine whether at least a second mobile device is located within a threshold distance of the first mobile device. In certain instances, for example, a first mobile device may determine that a second mobile device is located within a threshold distance based, at least in part, on one or more wireless signals communicated between the first mobile device and a second mobile device. In certain instances, for example, a first mobile device may obtain information from one or more other electronic devices identifying whether a second mobile device is located within a threshold distance.

In response to a determination that the second mobile device is located within a threshold distance of the first mobile device, the first mobile device may obtain one or more navigation parameters that are indicative of an initial position and/or movement of the second mobile device. Here, for example, an initial position and/or movement of the second mobile device may have been determined based, at least in part, on one or more sensors (e.g., one or more inertial sensors, and/or one or more environmental sensors) that may be provisioned onboard the second mobile device. For example, in certain instances a navigation parameter may comprise a position coordinate (e.g. possibly from a recent position fix), a relative position measurement, a velocity measurement, an odometry measurement, just to name a few examples.

Since the first and second mobile devices are located within a threshold distance of one another, the navigation parameter of the second mobile device may serve as a proximity constraint in determining or otherwise affecting a determined position and/or movement of the first mobile device. In certain instances, such a determined position and/or movement may correspond to a previous, current, or projected/future estimate of a position and/or movement. For example, if the threshold distance is five meters (5 m) then a determined position and/or movement of the first mobile device may be constrained to be within 5 m of the second mobile device. It should be recognized that one or more proximity constraints may vary in effect based upon the type of information provided to the first mobile device via the one or more navigation parameters. Nonetheless, as may be expected, the first mobile device may benefit from the additional information by determining and/or otherwise affecting its own position and/or movement in some manner based, at least in part, on the navigation parameter(s).

In certain example implementations, a first mobile device may determine and/or otherwise obtain a range between the first mobile device and the second mobile device based, at least in part, on one or more wireless signals communicated between the first mobile device in the second mobile device. Thus, for example, in certain implementations a first mobile device may affect its position and/or movement based, at least in part, on the range.

In certain example implementations, a first mobile device may obtain a subsequent navigation parameter indicative of a subsequent position and/or movement of the second mobile device, determine and/or otherwise obtain a second range between the first mobile device and the second mobile device based, at least in part, on one or more further wireless signals communicated between the first mobile device and the second mobile device, and affect its position and/or movement based, at least in part, on the subsequent navigation parameter and the second range. In certain example implementations, a navigation parameter and one or more subsequent navigation parameters may be obtained by the first mobile device directly from a second mobile device, e.g., over one or more wireless communication links. In certain other example implementations, a navigation parameter and one or more subsequent navigation parameters may be obtained by the first mobile device indirectly from a second mobile device, e.g., via one or more other intervening electronic devices. In certain other example implementations, a navigation parameter may be obtained by the first mobile device directly from the second mobile device and a subsequent navigation parameter may be obtained by the first mobile device from the second indirectly via another electronic device. Further still, and conversely, in certain example implementations, a navigation parameter may be obtained by the first mobile device indirectly from the second mobile device via another electronic device and a subsequent navigation parameter may be obtained by the first mobile device directly from the second mobile device.

While many of the examples described herein specifying the use of the first and second mobile device as part of a collaborative navigation scheme, it should be kept in mind that the various implementations presented herein are intended for use with a plurality of mobile devices, wherein one or more of the plurality of mobile devices may have its own position and/or movement determined and/or otherwise affected in some manner based, at least in part, on at least one navigation parameter obtained for at least one other mobile device. Thus, for example, in certain example implementations, a first mobile device may further obtain another navigation parameter indicative of a position and/or movement of another mobile device (e.g., a third mobile device), and affect its own position and/or movement based, at least in part, on the another navigation parameter. Here, for example, such a position and/or movement of the third mobile device may, at times, be based, at least in part, on a position fix that may have been based, at least in part, on a wireless positioning signal received by other mobile device (e.g., from a terrestrial-based wireless positioning system, an SPS, etc.).

In certain example implementations, the first mobile device may be located in an indoor environment which may correspond to an electronic map that identifies one or more navigation constraints within the indoor environment for a mobile device (e.g., a user carrying the first mobile device). Such an electronic map may, for example, comprise a floor plan of the building wherein certain features such as walls, etc., may represent navigation constraints. In certain instances, an electronic map may, for example, comprise derivative information in the form of a connectivity map, a routability graph, and/or the like or some combination thereof, which may specify feasible routes that a mobile device may likely follow in navigating within the indoor environment. Accordingly, in certain implementations, a first mobile device may further affect its own position and/or movement based, at least in part, on one or more such navigation constraints.

In certain example implementations, a mobile device may further consider one or more active constraints in determining and/or otherwise affecting its own position/movement. In certain example implementations, such an active constraint may be based, at least in part, on a presence or absence of a detectable user action. Thus, for example, a first mobile device may, at times, solicit a user to undertake certain actions that will move the first mobile device in some manner and which may be detectable by the first mobile device, e.g., using one or more user inputs, one or more inertial and/or environmental sensors, and/or the like or some combination thereof. For example, in certain instances a user may be solicited via a visual or audio output device to answer one or more questions regarding the indoor environment at or about the actual location of the first mobile device. In certain example implementations, a solicitation for a detectable user action may be based, at least in part, on at least a navigation constraint identified within an electronic map. By way of example, a user may be asked to confirm whether a staircase, a hallway, a particular room, a particular point of interest, etc., does or does not appear in at or nearby the user's position. By way of example, a user may be asked to undertake a particular motion, e.g., possibly turning and proceeding in a particular direction, or possibly gesturing with the mobile device in a particular direction of some feature and/or other object within the actual indoor environment, etc., wherein such movements of the first mobile device may be detected or otherwise determined in some manner by the sensors on board the first mobile device. The results of such a solicitation may, as mentioned above, present and active constraint that may be taken into consideration in affecting a determined position and/or movement of the first mobile device. Here, for example, it should be recognized that such an active constraint may add additional knowledge with regard to an indoor environment that the first mobile device may take into consideration in determining its own current and/or position/movement. In certain other implementations, it may be beneficial for one or more other mobile devices to provide such additional knowledge/ information by performing detectable user actions in response to a solicitation. The results of such an active constraint may, for example, indicate to one or more of the other mobile devices, e.g., via one or more shared navigation parameters. Hence, for example, in certain implementations, a first mobile device may request that a second mobile device attempt to obtain further information associated with such active constraints as may be experienced by the second mobile device at its present position within the indoor environment. For example, in certain implementations a first mobile device may request that a second mobile device solicit its user to determine whether or not a second mobile device may be located on the same floor of a building as the first mobile device.

In certain example implementations, a first mobile device may determine its own position and/or movement based, at least in part, on at least one of: a plurality of navigation parameters for a plurality of mobile devices, including the first mobile device and the second mobile device, an odometry measurement for at least one of the plurality of mobile devices, and/or the like or some combination thereof.

In certain example implementations, a first mobile device may determine its own position and/or movement based, at least in part, on a range measurement from the first mobile device to another electronic device, e.g., applied as a proximity constraint to a movement of the first mobile device over time. In certain example implementations, a first mobile device may determine its own position and/or movement based, at least in part, on a feature in an electronic map of an indoor environment surrounding the first mobile device, e.g., applied as a navigation constraint to the movement of the first mobile device over time. In certain example implementations, a first mobile device may determine its own position and/or movement based, at least in part, on a presence or absence of a detectable user action at the first mobile device applied as an active constraint to the movement of the first mobile device over time.

As described in greater detail herein, in certain example implementations, a first mobile device may transmit one or more local navigation parameters to one or more other mobile devices. Here, for example, a local navigation parameter may be indicative of at least one of an initial determined position and/or movement of the first mobile device, a determined position and/or movement of the first mobile device, and/or the like or some combination thereof. In certain example implementations, a first mobile device may transmit a local navigation parameter to another mobile device directly e.g., over one or more wireless communication links, and/or indirectly, e.g., via one or more intervening electronic devices.

As described in greater detail herein, in certain example implementations, a determination as to whether or not a second mobile device is located within a threshold distance of a first mobile device may be based, at least in part, on a wireless signal communicated between the first mobile device and the second mobile device. Indeed, in certain example implementations, a threshold distance for such a proximity determination may be based, at least in part, on at least a proximity constraint corresponding to an operable communication range of a first radio provisioned in the first mobile device and a second radio provisioned in the second mobile device. For example, in certain example implementations, and operable communication range may comprise and/or be based on, at least in part, a wireless personal area network (WPAN) range for a WPAN using at least one of the first radio or the second radio. Hence, for example, in certain implementations, the first and/or second radios may implement a shorter range communication standard and/or other like definition, e.g., such as Bluetooth, etc. Thus for example, certain implementations, an operable communication range as experienced within the indoor environment may serve as a threshold distance for a proximity determination between two mobile devices. Hence, for example, if a radio technology having a 10 m range is implemented, and assuming that such range is operably provided within the indoor environment by the two devices, then the approximate 10 m range they serve as a threshold distance. In other example implementations, a threshold distance may be selected which may be less than an operable communication range for a given radio technology has implemented in the two devices and/or experienced within the indoor environment. Thus, for example, despite having a 10 m operative range, a threshold distance may be selected which is less than 10 m, e.g. 5 m, or 3 m, for example. As may be observed, a threshold distance may be pre-selected and/or dynamically selected depending upon the design and/or other implementations considerations. Indeed, in certain implementations, a threshold distance may be reduced or expanded based on a number of applicable mobile devices within a given region of an indoor environment, the types and/or capabilities of such applicable mobile devices, the capabilities of any supporting electronic devices, etc.

As described in greater detail herein, in certain example implementations, a first mobile device may, at times, use a navigation parameter, at least in part, as a substitute for a local navigation parameter. Here, for example, a local navigation parameter may be indicative of a determined position and/or movement of the first mobile device and may be based, at least in part, on a local sensor at the first mobile device. Moreover, in certain example implementations, a first mobile device may selectively abstain in some manner from determining at least a part of the local navigation parameter based, at least in part, on an expectation that a substitutable navigation parameter for one or more other mobile devices may be obtained shortly or may already have been obtained, e.g. directly or indirectly from the one or more other mobile devices. Thus, for example, in certain instances a first mobile device may use in navigation parameter from the second mobile device rather than to use its own navigation parameter in determining and/or otherwise affecting its own position/movement. Thus, for example, at times a first mobile device may benefit by not having to determine its own navigation parameter, e.g., which may reduce power consumption in the first mobile device. By way of example, as part of the collaborative navigation scheme, a first mobile device and a second mobile device may become aware that they essentially being moved together by the same mechanism or person. For example, a person may be carrying a smart phone and a tablet computer. Hence, the range between the two devices may be exceedingly short (e.g., 50-300 cm) and as such it may be beneficial for only one of the mobile devices to operate its inertial sensor(s) to obtain certain navigation parameters, which then both devices may use. Indeed, in such an example, one mobile device may substitute the other mobile devices determined position and/or movement as its own, at least while certain proximity conditions remain in place.

In another example, it should be recognized that the first and second mobile devices may be carried by two different people or mechanisms that happened to be moving in unison in some manner, and as such while such proximity conditions remain in place, it may be beneficial for just one of the mobile devices (e.g., perhaps the mobile device with the more efficient circuitry, higher accuracy circuitry, higher remaining power reserve, available processing/memory, etc.) to determine one or more navigation parameters, etc. Thus, for example, as part of a collaborative navigation scheme certain processes may be distributed or otherwise coordinated between two or more mobile devices. Additionally, in certain implementations, all or part of one or more processes and/or functions that may be used to support a collaborative navigation capability in at least one of the mobile devices may, for example, be performed by one or more other electronic devices, e.g., computing devices that may be networked with or otherwise made available to the mobile device.

Further, as may be appreciated, as part of a collaborative navigation scheme a plurality of mobile devices may be arranged to not only share information, such as navigation parameters, with certain other mobile devices, but to also pass on such information to still other mobile devices. Thus, for example, in the examples presented herein, a first mobile device may obtain a navigation parameter from a second mobile device (e.g., directly or indirectly) and may subsequently pass (e.g., directly or indirectly) the navigation parameter from the second mobile device onto one or more other mobile devices.

With this introduction mind, attention is drawn first to FIG. 1, which is a schematic block diagram illustrating an example environment 100 that includes representative electronic devices that may perform and/or otherwise support certain collaborative navigation schemes, in accordance with an example implementation.

In this example, a plurality of mobile devices, namely mobile devices 104-1, 104-2, . . . , 104-n (i.e., where n represents a positive integer), are illustrated as being positioned within an indoor environment 125, and computing device 102 and other resources 130 are illustrated as being positioned outside of indoor environment 125, along with network(s) 120 which may provide for interconnectivity between computing device 102, other resources 130, and/or the various mobile devices. It should be understood that in certain other implementations, computing device 102 and/or one or more other resources 130, and/or all or part of networks 120 may be located at least partially within indoor environment 125.

In the examples herein, the term "mobile device 104" may be used to generally reference at least one of the mobile devices in a general sense rather than in a specific sense. Further, in certain example implementations, a first mobile device may be considered as referring to mobile device 104-1, a second mobile device may be considered as referring to mobile device 104-2, and a third or possibly other/another mobile device may be considered as referring to mobile device 104-n.

Additionally as illustrated, various terrestrial-based transmitting devices 140 (e.g., access points, etc.) may be provided within environment 100. As shown, in certain implementations one or more transmitting devices 140 may be provisioned within an indoor environment 125, or outside of indoor environment 125, or within a network(s) 120, and configured to transmit one or more wireless signals 142 that may, at times, be acquired by a mobile device and used for positioning and/or navigation purposes. Additional description of such devices is provided herein, although the technology is well known.

Further still, as illustrated, one or more satellite positioning system systems (SPS) 150 may be provided to transmit one or more wireless positioning signals in the form of one or more SPS signals 152 that may, at times, be acquired by mobile device and used for positioning and/or navigation purposes. Additional description of such devices as provided herein although the technology is well known.

As shown, computing device 102 comprises an apparatus 112 that may support certain collaborative navigation schemes as described herein. For example, in certain implementations, apparatus 112 may receive certain navigation parameters from one or more mobile devices, possibly store such navigation parameters, and/or otherwise provide one or more of such navigation parameters to one or more other mobile devices. Hence, in certain instances, apparatus 112 may function as an intermediary exchange, server, and/or other like repository of shared navigation parameters. In certain instances, apparatus 112 may, for example, provide further processing of certain information within and/or otherwise relating to one or more navigation parameters and/or other measurements that may be obtained from one or more mobile devices. Thus for example, in certain implementations, apparatus 112 may support a collaborative navigation scheme by providing certain communication and/or processing capabilities available for use by one or more of the mobile devices.

In certain example implementations, computing device 102 and/or other resources 130 may provide additional data and/or instructions that may be of use by one or more mobile devices, apparatus 110, apparatus 112, as may be beneficial to a particular collaborative navigation scheme, and/or one or more positioning and/or navigation functions that may be provided within one or more of the mobile devices.

Apparatus 112 may represent one or more computing platforms that may communicate with one or more other resources (devices) 130, either directly and/or indirectly, e.g. via one or more network(s) 120. Apparatus 112 may communicate with mobile device 104, either directly and/or indirectly, the latter which is illustrated using network(s) 120 and wireless communication link 122. Again, while computing device 102 happens to be illustrated in this example as being located outside of indoor environment 125, it should be recognized that in certain other implementations, all or part of computing device 102 and/or apparatus 112 may be located within indoor environment 125.

Network(s) 120 may comprise one or more communication systems and/or data networks having various interconnected devices supporting communication between computing device 102 and one or more other resources (devices) 130. As mentioned, network(s) 120 may further support communication between computing device 102 and mobile device 104. For example, communication between computing device 102 and mobile device 104 may allow for certain data and/or instructions to be exchanged there between.

As used herein a "mobile device" may represent any electronic device that may be moved about either directly or indirectly by a user within an indoor environment and which may communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Other resources (devices) 130 may represent one or more computing platforms from which computing device 102 and/or mobile device 104 may obtain certain data files and/or instructions, and/or to which computing device 102 and/or mobile device 104 may provide certain data files and/or instructions. For example, in certain instances, all or part of an electronic map, a connectivity map, a routability graph, and/or the like may be obtained by computing device 102 and/or mobile device 104 from one or more other resources (devices) 130. For example, in certain instances, all or part of a set of instructions for use in apparatus 112 and/or apparatus 110 may be obtained from other resources (devices) 130.

As mentioned, SPS 150 which may transmit one or more SPS signals 152 to mobile device 104. SPS 150 may, for example, represent one or more global navigation satellite system (GNSS), one or more regional navigation satellite systems, and/or the like or some combination thereof. Additionally, one or more terrestrial-based positioning systems may be provided as represented by example transmitting device(s) 140 capable of transmitting one or more wireless signals 142 all or some of which may be used for signal-based positioning. Thus for example, transmitting device(s) 140 may represent a wireless access point, a base station, a repeater, a dedicated beacon transmitting device, just to name a few examples, which have known positions. SPS signals 152 and/or wireless signals 142 may, at times, be acquired by mobile device 104 and used to estimate its position.

In certain implementations, a mobile device 104 may receive or acquire SPS signals 152 from SPS satellites (not shown). In some embodiments, SPS satellites may be from one GNSS, such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In certain implementations, mobile device 104 may transmit radio signals to, and receive radio signals from, a wireless communication network (e.g., represented by network(s) 120). In one example, mobile device may communicate with a cellular communication network (e.g., represented by network(s) 120) by transmitting/receiving wireless signals over a wireless communication link 122 to/from a base station transceiver or the like. Similarly, mobile device 104 may receive wireless signals 142 from one or more transmitting devices 140. In certain instances, mobile device 104 may also transmit wireless signals to one or more transmitting devices 140.

In a particular example implementation, mobile device 104 and/or computing device 102 may communicate with each other and/or other resources (devices) 130 over network(s) 120. As mentioned, network(s) 120 may comprise any combination of wired or wireless links. In a particular implementation, network(s) 120 may comprise an Internet Protocol (IP) infrastructure and/or the like, which may be capable of facilitating communication between mobile device 104, computing device 102 and/or other resources (devices) 130. In another example implementation, network(s) 120 may comprise cellular communication network infrastructure such as, for example, a base station controller or master switching center to facilitate mobile cellular communication with mobile device 104.

In particular implementations, and as discussed below, mobile device 104 may have circuitry and processing resources capable of computing a position fix of mobile device 104. For example, mobile device 104 may compute a position fix based, at least in part, on pseudorange measurements to one or more SPS satellites. Here, mobile device 104 may compute such pseudorange measurements based, at least in part, on of pseudonoise code phase detections in SPS signals 152 acquired from one or more SPS satellites. In particular implementations, mobile device 104 may receive SPS positioning assistance data that may aid in the acquisition of SPS signals 152 transmitted by SPS 150 including, for example, almanac, ephemeris data, Doppler search windows, just to name a few examples.

In other implementations, mobile device 104 may obtain a position fix by processing signals received from one or more cellular network transmitting devices and/or the like having known positions (e.g., such as base station transceiver, etc.) using any one of several techniques such as, for example, advanced forward trilateration (AFLT), observed time difference of arrival (OTDOA), etc. In certain example implementations, a range from mobile device 104 may be measured to a plurality of such cellular network transmitting devices, e.g., based, at least in part, on pilot signals transmitted by the cellular network transmitting devices from their known locations and received at mobile device 104. In certain instances, computing device 102, network(s) 120, and/or other resources (devices) 130 may be capable of providing certain forms of cellular network positioning assistance data to mobile device 104, which may include, for example, locations and identities of base transceiver stations, etc., to facilitate certain positioning techniques that might use cellular network signals. For example, a base station almanac (BSA) which indicates locations and identities of cellular base stations in a particular region or regions.

In particular environments, such as indoor environment 125, mobile device 104 may not be capable of acquiring signals from a sufficient number of SPS satellites and/or from a sufficient number of cellular network transmitting devices to effectively perform the requisite processing to efficiently compute a position fix. However, mobile device 104 may be capable of computing a position fix based, at least in part, on one or more wireless signals 142 acquired from transmitting devices 140 (e.g., WLAN access points positioned at known locations, etc.). For example, mobile device 104 may obtain a position fix by measuring ranges to one or more indoor terrestrial wireless access points which are positioned at known locations. Such ranges may be measured, for example, by obtaining a MAC ID address from signals received from such access points and obtaining range measurements to the access points by measuring one or more characteristics of one or more signals received from such access points such as, for example, received signal strength (RSSI) or round trip time (RTT). In alternative implementations, mobile device 104 may obtain an indoor position fix by applying characteristics of acquired signals to a radio heatmap, probability heatmap, and/or the like or some combination thereof indicating expected RSSI and/or RTT signatures at particular locations in the indoor environment.

Terrestrial-based wireless positioning signal systems typically rely on deployment of several transmitting devices 140 (e.g., WiFi hotspots) at fixed (known) locations to enable a mobile device to obtain range measurements to the fixed locations based, for example, on measurements of signals transmitted from the transmitting devices as pointed out above. However, some indoor areas, e.g., such as representative indoor environment 125, may not have a dense enough population of transmitting devices to always enable convenient position fixes by measuring ranges to multiple transmitting devices 140. Additionally, some indoor environments have features (e.g., interior walls and other obstructions) that may lead to multipath reception, attenuate signal strength to create dead spots, etc., that may further complicate indoor positioning.

As described in greater detail herein, in certain example implementations, two mobile devices in indoor environment 125 may be capable of measuring a range between one another by, for example, receiving each other's short-range radio transmissions (e.g., IEEE 802.11, Bluetooth, etc.). In one implementation, a first mobile device may, for example, measure a range to the second mobile device based, at least in part, on signals transmitted from the second mobile device and received at the first mobile device (e.g., using received signal strength, round trip time, etc.). Here, as described in greater detail herein, a measured range between the first and second mobile devices, in combination with one or more navigation parameters obtained from the mobile devices over some time interval, may be used for determining a position for one or both of the mobile devices. In one implementation, displacement of a mobile device or distance that the mobile device travels over a time period may be measured based, at least in part, on signals generated by at least one sensor (e.g., accelerometer, gyroscope, magnetometer, etc.).

As described in greater detail herein, in certain example implementations, one or more "navigation parameters" for one or more mobile devices may be obtained directly or indirectly from one or more mobile devices and used, at least in part, to determine a position of a particular mobile device. Similarly, in certain example implementations, one or more mobile devices may provide one or more navigation parameters to one or more other electronic devices (e.g., one or more mobile devices, one or more computing devices, etc.) for use in determining a position of another mobile device.

As described in greater detail herein, a navigation parameter may, for example, comprise or be based, at least in part, on one or more signals from one or more inertial or environmental sensors. For example, in certain implementations a navigation parameter may comprise or be based, at least in part on, an odometry measurement, a relative position measurement, a velocity measurement, a trajectory measurement, a heading measurement, a (altitude) height measurement, and/or the like or some combination thereof with regard to a mobile device. In certain instances, a navigation parameter may further comprise or be based, at least in part, on an indication of position and/or movement accuracy, a positioning resource identifier, a timestamp, and/or the like or some combination thereof.

As used herein, the phrase "position and/or movement" is intended to comprise, as may be applicable in a given context, information indicative of a position of a mobile device, or a movement of a mobile device, or both a position and a movement of a mobile device.

Unless specified otherwise, the term "navigation parameter" as used herein is intended to broadly include any information about a mobile device that may be shared with one or more other mobile devices, and which may be of use in determining a position and/or movement of one or more of the other electronic devices. In certain implementations, such a navigation parameter may be shared directly between the applicable mobile devices, e.g., over one or more wireless communication links. In certain other implementations, such a navigation parameter may be shared indirectly between applicable mobile devices, e.g., via one or more other intervening electronic devices.

In certain implementations, as shared (e.g., transmitted/received or otherwise provided/obtained) such a navigation parameter may, for example, comprise all or part of one or more "measurements" that may be indicative of a position and/or movement of a mobile device. A "measurement" may, for example, comprise one or more forms of raw information and/or further processed information (e.g., in the form of data represented by one or more electrical signals). For example, a sensor (e.g., inertial or environmental) onboard a mobile device may generate raw information, e.g., in the form of one or more electrical signals representing a digital wave form, representing an analog wave form, etc. In certain instances, such raw information may represent a measurement from a sensor. In certain instances, such raw information may be further processed or otherwise made use of to form a measurement from the sensor. For example, raw sensor information from an accelerometer may be further processed (e.g., integrated over time) to obtain a velocity measurement. In certain instances, a sensor or a receiver may actually generate further processed information instead of, or in addition to, raw sensor information. For example, certain accelerometers may generate data that has been further processed, e.g., possibly filtered or otherwise smoothed to reduce noise, account for a temperature, normalize or otherwise adjust measured values, and/or to embed additional information (e.g., time, accuracy, etc.), etc.

By way of another example, a receiver, e.g., in a communication interface, an SPS receiver, etc., onboard a mobile device may acquire one or more transmitted wireless positioning signals, SPS signals, etc., and based thereon generate raw information and/or further processed information, e.g., in the form of one or more electrical signals representing a digital wave form, representing an analog wave form, etc. For example, certain receivers may be designed to simply generate raw positioning signal data representing an applicable acquired signal. In other instances, certain receivers may further process (often significantly) such acquired signals to obtain measurements based, at least in part, thereon. For example, a receiver in a communication interface may acquire a wireless positioning signal and based, at least in part, thereon generate an RSSI measurement, a RTT measurement, a pseudorange measurement, etc. For example, an SPS receiver may acquire a plurality of SPS signals and based, at least in part, thereon generate a position fix, etc. In certain instances, such raw or further processed receiver generated information may be further affected in some manner (e.g., using one or more circuit components, programmed logic, etc.) to obtain still further processed information.

In certain example implementations, a navigation parameter may comprise an odometry measurement which may represent processed information indicative of possible changes in a position and/or movement of a mobile device over time. For example, an odometry measurement may represent pedometer or other like processed information indicative of a distance traveled, a number of steps taken, a stride length, various time measurements, various force measurements, and/or the like or some combination thereof. In certain example implementations, an odometry measurement may comprise a dead reckoning measurement which may be indicative of new or updated position (estimate) (e.g., coordinate(s), displacement, distance, etc.) determined or inferred based, at least in part, on detected movement(s) or absence thereof from one or more inertial and/or environmental sensors.

In certain example implementations, a navigation parameter may comprise a relative positioning measurement which may represent processed information indicative of possible changes in a position and/or movement of a mobile device over time. For example, a relative positioning measurement may be indicative of a range, an angle, etc., from a mobile device to another electronic device, transmitting device, or possibly some detectable/known feature or object as may be determined or inferred based, at least in part, on one or more acquired wireless signals (e.g., transmitted by other devices, or possibly transmitted by the mobile device itself).

In certain example implementations, a navigation parameter may comprise a velocity measurement which may represent processed information indicative of a speed of movement of a mobile device at a particular time and/or over a particular period of time. For example, a velocity measurement may be determined, at least in part, based on one or more inertial sensors, and/or one or more wireless positioning signals, etc.

In certain example implementations, a navigation parameter may comprise a position coordinate which may represent processed information indicative of a position of a mobile device at a particular point in time and with respect to some coordinate system, electronic map, etc. For example, a position coordinate may specify one or more coordinate values as determined based on one or more sensors, and/or one or more wireless positioning signals, etc.

In certain example implementations, a navigation parameter may comprise a pseudorange which may represent processed information indicative of a range, distance, etc., between a mobile device and another electronic device, transmitting device, etc., at a particular point in time and with respect to some measurement system. For example, a pseudorange may specify a distance between two mobile devices in centimeters or meters, and/or a range to a transmitting device in meters or kilometers, just to name a few examples. In certain instances, a pseudorange may specify a distance based on a corresponding proportional time value. For example, a distance may be specified using a time value that may be multiplied by the speed of light in a vacuum to calculate the distance. A pseudorange may, for example, be determined based on one or more wireless positioning signals, etc.

In certain example implementations, a navigation parameter may comprise an inertial measurement which may represent raw and/or processed information indicative of one or more forces applied to a mobile device (e.g., due to a user navigating through an environment) and which may be sensed by one or more inertial sensors at a particular time or over one or more periods of time.

In certain example implementations, a navigation parameter may comprise a height measurement which may represent raw and/or processed information indicative of an altitude, barometric pressure, etc., which may be indicative of a position and/or movement of a mobile device with regard to a third dimension (e.g., a z-axis orthogonal to an x-axis and a y-axis, etc.), different floors or levels within an indoor environment, etc. For example, a height measurement may be based on one or more sensors, and/or one or more acquired wireless positioning signals, etc.

In certain example implementations, a navigation parameter may comprise information regarding a potential (likely) change in position and/or movement that may or may not actually occur in the future. For example, a navigation parameter may comprise a trajectory measurement which may be based, at least in part, on processed information indicative of past or current aspects regarding a mobile device's position and/or movement and one or more models (e.g., using Kalman filters, particle filters, etc.) or other like processes that project such information forward to a particular time and/or over a particular period of time in the future. For example, a trajectory measurement may comprise or otherwise make use of a heading measurement and a velocity measurement that the mobile device is likely to adhere to. For example, a trajectory measurement may take the form of a data pair, a vector, a projected coordinate, etc., with regard to a coordinate system, an electronic map, and/or the like. For example, a trajectory measurement may take the form of an expected (likely) route, etc., with regard to an electronic map and/or possibly a corresponding connectivity map and/or routability graph indicative of feasible navigation paths within an indoor environment. A trajectory measurement may, for example, be based on one or more sensors and/or one or more acquired wireless positioning signals, etc.

In certain example implementations, a navigation parameter may comprise a heading measurement which may represent processed information indicative of a direction of travel of a mobile device, e.g., as may have occurred, or as may be likely to occur presently or in the future, with respect to some coordinate system, electronic map, etc. For example, a heading measurement may specify an angle or direction relating a particular coordinate system. For example, a heading measurement may be based on one or more sensors, and/or one or more wireless positioning signals, etc.

In addition to various measurements and the like regarding a position and/or movement of a mobile device, a navigation parameter in certain instances may also include other information that may be related thereto and/or otherwise of use therewith. For example, in certain implementations, a navigation parameter may comprise an indication of position and/or movement accuracy which may specify in some manner an error range, a standard deviation, etc., for some measurement, prediction, etc. For example, in certain implementations, a navigation parameter may comprise a positioning resource identifier which may be indicative of the source(s) of, and/or other processing affecting, a measurement or the like. For example, in certain implementations, a navigation parameter may comprise one or more timestamps which may be indicative of one or more particular times or time periods in the past or future relating to one or more measurements, etc.

In certain implementations, a connectivity map and/or a routability graph (e.g., corresponding to an electronic map) may assist mobile device 104 in defining feasible areas or spaces for navigation within indoor environment 125, e.g., subject to physical obstructions (e.g., walls) and passage ways (e.g., doorways in walls), etc. Here, for example, by defining feasible areas for navigation, mobile device 104 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 104 may further apply a motion model to measurements or inferences obtained from inertial sensors (e.g., accelerometers, gyroscopes, etc.) and/or environment sensors (e.g., magnetometers, temperature sensors, microphones, barometric pressure sensors, ambient light sensors, camera imager, etc.) in estimating a position and/or movement of mobile device 104, and/or otherwise determining one or more navigation parameters.

Figure 2:
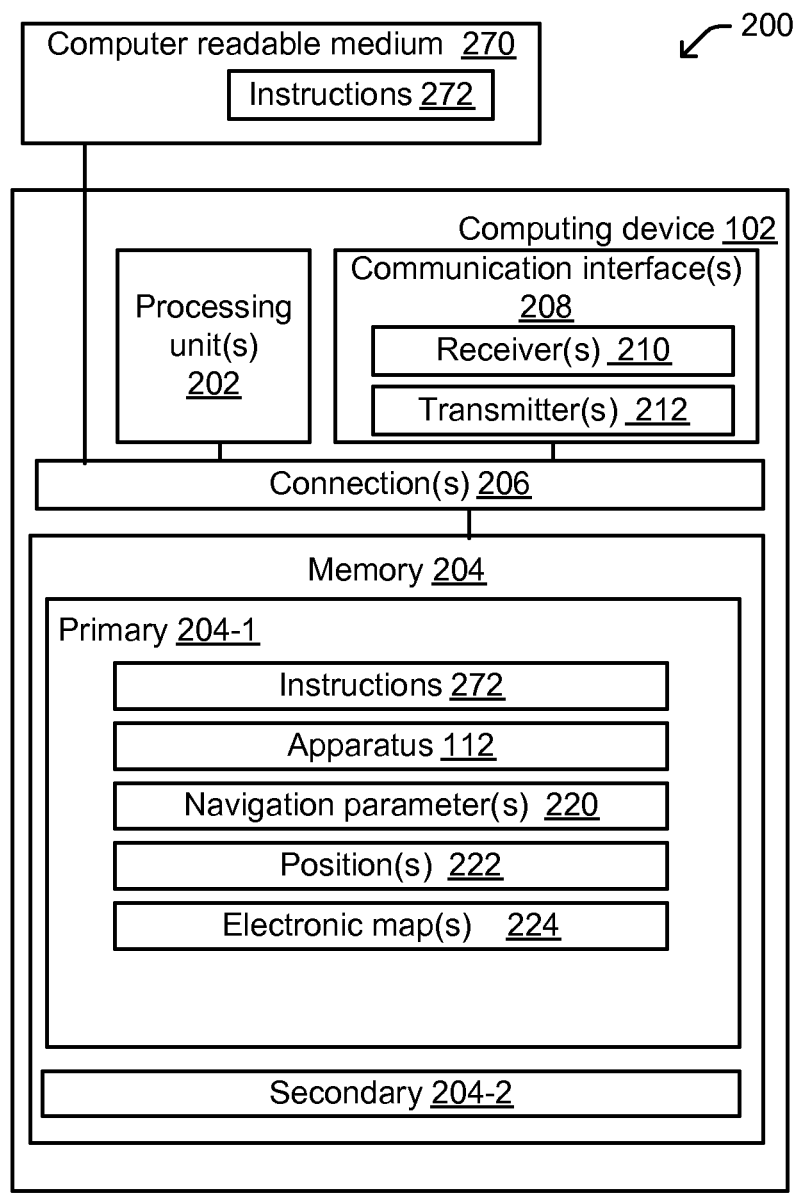
FIG. 2 is a schematic block diagram illustrating certain features of a computing platform that may be provided in an electronic device, such as a computing device, to support certain positioning and/or other like navigation capabilities in a mobile device in collaboration with at least one other mobile device, in accordance with an example implementation.

Attention is drawn next to FIG. 2, which is a schematic block diagram illustrating certain features of a computing platform 200 that may be provided in an electronic device, such as a computing device 102, to support certain positioning and/or other like navigation capabilities in a mobile device in collaboration with at least one other mobile device, in accordance with an example implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 270. Memory 204 and/or non-transitory computer readable medium 270 may comprise instructions 272 for use in performing data processing, e.g., in accordance with the techniques and/or example apparatus 112 (FIG. 1) as provided herein.

Computing platform 200 may, for example, further comprise one or more communication interface(s) 208. Communication interface(s) 208 may, for example, provide connectivity to network(s) 120, mobile device 104, and/or other resources (devices) 130 (FIG. 1), e.g., via one or more wired and/or wireless communication links. As illustrated here communication interface(s) 208 may comprise one or more receiver(s) 210, one or more transmitter(s) 212, and/or the like or some combination thereof. Communication interface(s) 208 may implement one or more communication protocols as may be required to support one or more wired and/or wireless communication links.

Processing unit(s) 202 and/or instructions 282 may, for example, provide or otherwise make use of one or more signals that may be stored in memory 204 from time to time and which may represent data and/or instructions, such as: instructions 272; apparatus 112; one or more navigation parameters 220 (e.g., for one or more mobile devices); one or more positions 222 (e.g., one or more mobile devices, and/or other electronic devices); one or more electronic maps 224, and/or the like that may be of use by one or more mobile devices independently and/or as part of a collaborative navigation capability; and/or the like or some combination thereof. It should be kept in line, that in certain example implementations, some types of data may comprise or otherwise be represented at least in part by one or more functions and/or other like computer implementable instructions, e.g., which may be used to calculate certain data values, etc.

Figure 3:
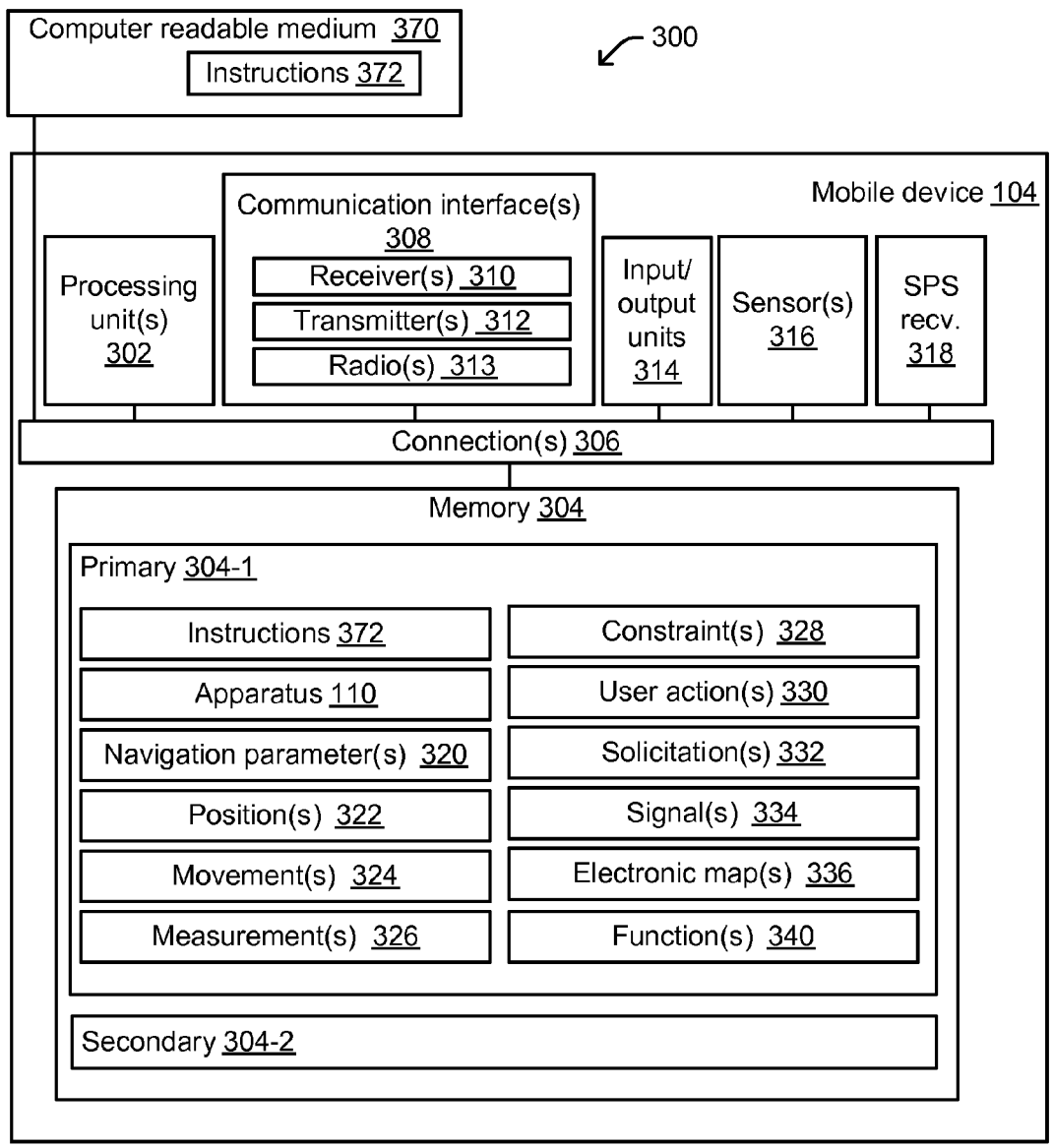
FIG. 3 is a schematic block diagram illustrating certain features of a computing platform that may be provided in an electronic device, such as a mobile device, to perform and/or otherwise support certain collaborative positioning and/or other like navigation capabilities therein, and/or in one or more other mobile devices, in accordance with an example implementation.

Attention is drawn next to FIG. 3, which is a schematic block diagram illustrating certain features of a computing platform 300 that may be provided in an electronic device, such as a mobile device 104, to perform and/or otherwise support certain collaborative navigation capabilities therein, and/or in one or more other mobile devices, in accordance with an example implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid motion state memory drive, etc In certain implementations, secondary memory may be operatively receptive of, or otherwise configurable to couple to, a non-transitory computer readable medium 370. Memory 304 and/or non-transitory computer readable medium 370 may comprise instructions 372 for use in performing data processing, e.g., in accordance with the techniques and/or example apparatus 110 (FIG. 1) and/or all or part of one or more example process 400 (FIG. 4, as provided herein.

Computing platform 300 may, for example, further comprise one or more communication interface(s) 308. Communication interface(s) 308 may, for example, comprise one or more radios, represented here by one or more receivers 310, one or more transmitters 312 and/or one or more radios 313. It should be understood that in certain implementations, one or more radios 313 may comprise one or more receivers, one or more transmitters, and/or one or more transceivers, and/or the like. Further, it should be understood that although not shown, one or more radios 313 may comprise one or more antennas and/or other circuitry as may be applicable given the radios function/capability.

By way of further example, communication interface(s) 308 may, for example, provide connectivity to network(s) 120, computing device 102, and/or other resources (devices) 130 (FIG. 1), e.g., via one or more wired and/or wireless communication links. As illustrated here communication interface(s) 308 may comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving wireless signals 142 from one or more transmitting devices 140 of one or more terrestrial-based positioning systems. Further, in certain example instances, mobile device 104 may comprise an SPS receiver 318 capable of receiving and processing SPS signals 152 in support of one or more signal-based positioning capabilities.

In accordance with certain example implementations, communication interface(s) 208, communication interface(s) 308, radio(s) 313, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user. For example, input/output units 314 may be used to present a solicitation to the user and to obtain certain corresponding user inputs.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc.

As previously described, one or more sensors 316 may be used to obtain one or more navigation parameters for use in the mobile device and/or one or more other mobile devices, e.g., as part of a collaborative navigation capability.

Processing unit(s) 302 and/or instructions 372 may, for example, provide or otherwise make use of one or more signals that may be stored in memory 304 from time to time and which may represent data and/or instructions, such as: instructions 372; apparatus 110; one or more navigation parameters 320; one or more positions 322 (e.g., of the mobile device itself and/or one or more other mobile devices, and/or electronic devices); one or more movements 324 (e.g., of the mobile device itself and/or one or more other mobile devices); one or more measurements 326 (e.g., for one or more sensors 316 and/or one or more wireless signals acquired via communication interface(s) 308, and/or possibly one or more measurements from one or more other mobile devices); one or more constraints 328 (e.g., one or more proximity constraints, one or more navigation constraints, one or more active constraints, and/or the like or some combination thereof); one or more detectable user actions 330 (e.g., obtained via one or more input/output units 314 and/or one or more sensors 316); one or more signals 334 (e.g., as acquired via communication interface(s) 308); one or more electronic maps 336 and/or the like (e.g., for one or more indoor environments); one or more functions 340 (e.g. one or more positioning capabilities, one or more navigation capabilities, etc.), and/or the like or some combination thereof. It should be kept in line, that in certain example implementations, some types of data may comprise or otherwise be represented at least in part by one or more functions and/or other like computer implementable instructions, e.g., which may be used to calculate certain data values, etc. Additionally, while some the example data and/or instructions as illustrated in FIG. 3 share the same reference numbers as example data and/or instructions as illustrated in FIG. 2, it should be kept in mind that in certain instances all or part of such example data and/or instructions may be distinctly different.

SPS receiver 318 may be capable of receiving and acquiring SPS signals 152 via one or more antennas (not shown). SPS receiver 318 may also process, in whole or in part, acquired SPS signals 152 for estimating a position or location of mobile device 104. In certain instances, SPS receiver 318 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 302, memory 304, etc., in conjunction with SPS receiver 318. Storage of SPS or other signals for use in performing positioning operations may be performed in memory 304 or registers (not shown).

Sensors 316 may generate analog or digital signals that may be stored in memory 304 and processed by DPS(s) (not shown) or processing unit(s) 302 in support of one or more applications such as, for example, applications directed to positioning or navigation operations.

Processing unit(s) 302 may comprise a dedicated modem processor or the like that may be capable of performing baseband processing of signals received and downconverted at receiver(s) 310 of communication interface(s) 308 or SPS receiver 318. Similarly, a modem processor or the like may perform baseband processing of signals to be upconverted for transmission by wireless transmitter(s) 312. In alternative implementations, instead of having a dedicated modem processor, baseband processing may be performed by a general purpose processor or DSP (e.g., general purpose/application processor). It should be understood, however, that these are merely examples of structures that may perform baseband processing, and that claimed subject matter is not limited in this respect.

Figure 4:
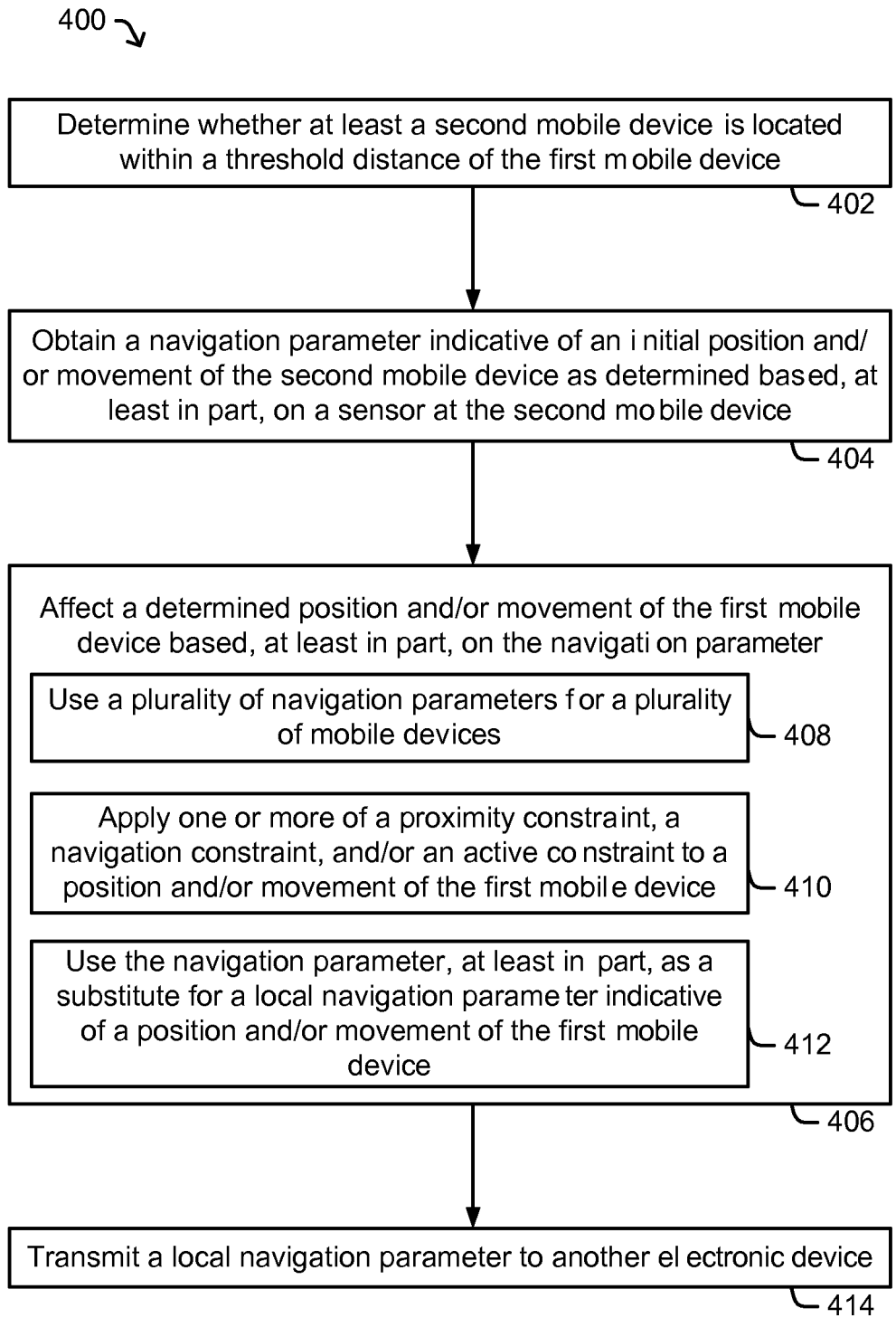
FIG. 4 is a flow diagram illustrating an example process that may be implemented in whole or in part in an electronic device, such as a mobile device, to perform and/or otherwise support certain collaborative positioning and/or other like navigation capabilities therein, and/or in one or more other mobile devices, in accordance with an example implementation.

Attention is drawn next to FIG. 4, which is a flow diagram illustrating an example process 400 that may be implemented in whole or in part in an electronic device, such as a mobile device, to perform and/or otherwise support certain collaborative navigation between the plurality of mobile devices, in accordance with an example implementation.

Process 400 may, for example, be performed in a first mobile device, such as, for example, first mobile device 104-1 of FIG. 1, and/or mobile device 104 as represented in FIG. 3, just to name a few examples.

At example block 402, a determination may be made or otherwise obtained is to whether at least a second mobile device is located within a threshold distance of the first mobile device. For example, as previously mentioned one or more signals may be exchanged between the first mobile device and the second mobile device and used to estimate a range between the two mobile devices. For example, as previously mentioned, in certain example implementations, such a determination may be made in the first mobile device, the second mobile device, and/or some other electronic device, depending upon the implementation. Additionally, as previously mentioned, a threshold distance may be predetermined and/or dynamically determined based on various considerations. In certain example implementations, a threshold distance may, for example, represent and/or otherwise be based, at least in part, on an operative range of a particular radio technology.

At example block 404, a navigation parameter indicative of an initial position and/or movement of the second mobile device may be obtained, e.g., either directly and/or indirectly from the second mobile device. Here, for example, a navigation parameter from the second device may be determined based, at least in part, on one or more sensors at the second mobile device. As previously mentioned, in certain example implementations, a navigation parameter may comprise raw sensor data, raw signal data, and/or further processed versions thereof. In certain example implementations, a navigation parameter may be associated with one or more particular points in time and/or one or more periods or intervals of time. In certain example implementations, a navigation parameter may be associated with a current time, one or more past time(s), and/or one or more future time(s).

At example block 406, a determined position and/or movement of the first mobile device may be determined and/or otherwise affected based, at least in part, on the navigation parameter. At example block 408, a plurality of navigation parameters for one or more mobile stations and/or four a plurality of mobile devices may be used. At example block 410, one or more of a proximity constraint, a navigation constraint, and/or an active constraint may be applied in some manner to affect a determination of a determined position and/or movement of the first mobile device. For example, a proximity constraint for one or more other mobile devices may be taken into consideration. For example, a navigation constraint for electronic map in or other like data may be taken into consideration. For example, an active constraint based on a solicitation for detectable user response at the first mobile device and/or one or more other mobile devices may be taken into consideration. At example block 412, in certain instances, one or more navigation parameters may be substituted, in whole or in part, for one or more local navigation parameters that would have otherwise been indicative of a determined position and/or movement of the first mobile device.

At example block 414, in certain implementations, one or more local navigation parameters may be transmitted to another electronic device. For example, one or more local navigation parameters may be transmitted directly to one or more other mobile devices. For example, one or more local navigation parameters may be transmitted indirectly to one or more other mobile devices, e.g. via one or more intervening electronic devices.

Figure 5:
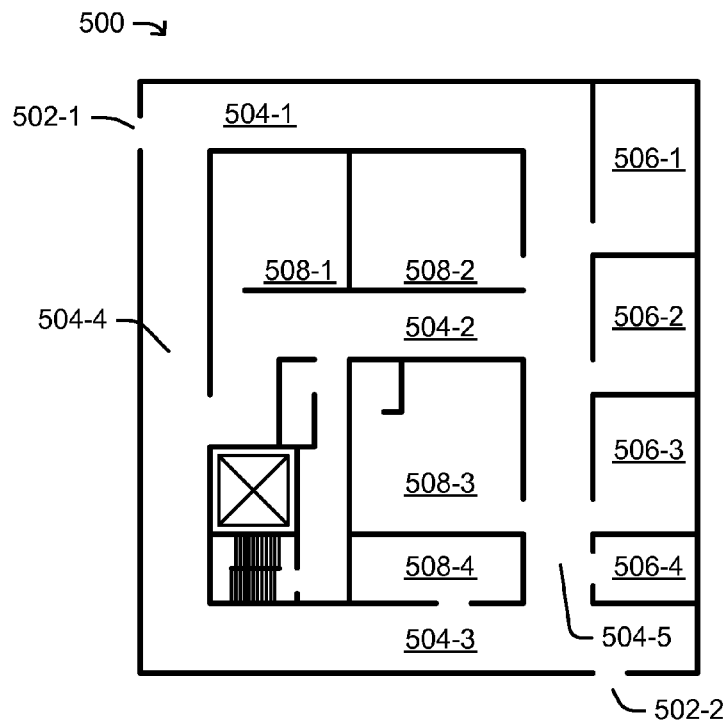
FIG. 5 is an illustrative diagram showing certain features that may be identified in an electronic map for an indoor environment through with a mobile device may navigate, in accordance with an example implementation.

Attention is drawn next to FIG. 5, which is an illustrative diagram showing certain features of a floor plan 500 that may be identified in an electronic map and/or the like for an indoor environment through which a mobile device may navigate, in accordance with an example implementation.

As shown, floor plan 500 comprises one floor of a small structure, having two entry/exit ways 502-1 and 502-2. Entry/exit way 502-1 provides access to always 504-1 and 504-4. Entry/exit way 502-2 provides access to hallway 504-3 and hallway 504-5. Hallway 504-5 eventually meets with hallway 504-1, and hallway 504-3 eventually meets with hallway 504-4. Towards the center of the floor plan, a hallway 504-2 interconnects hallways 504-4 and a hallway 504-5. Offices 506-1, 506-2, 506-3, and 506-4 may be reached via hallway 504-5, as might room 508-3. Room 508-4 may be reached via hallway 504-3. Rooms 508-1 and 508-2 may be reached via hallway 504-2, which also leads to additional illustrated features in the form of an elevator and staircase in addition to a corresponding access hallway (not labeled). It should be understood that floor plan 500 is illustrated here just for the purposes showing some example aspects of a collaborative navigation scheme between a first mobile device and a second mobile device within the hallways of floor plan 500.

Figure 6A:
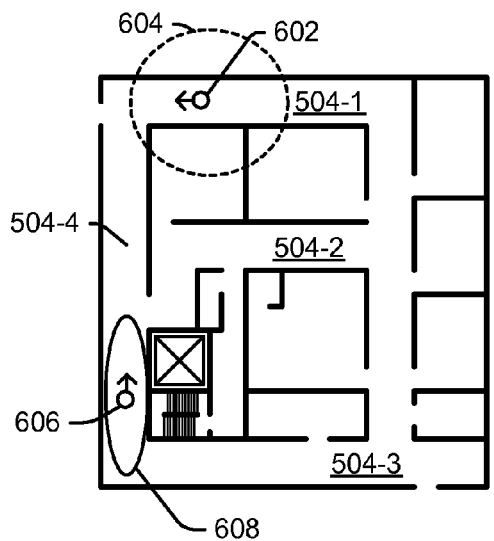
FIG. 6A and FIG. 6B are illustrative diagrams similar to FIG. 5, and further illustrating an aspect of certain collaborative positioning and/or other like navigation capabilities with regard to two mobile devices being moved further apart over time within an example indoor environment, in accordance with an example implementation.
Figure 6B:
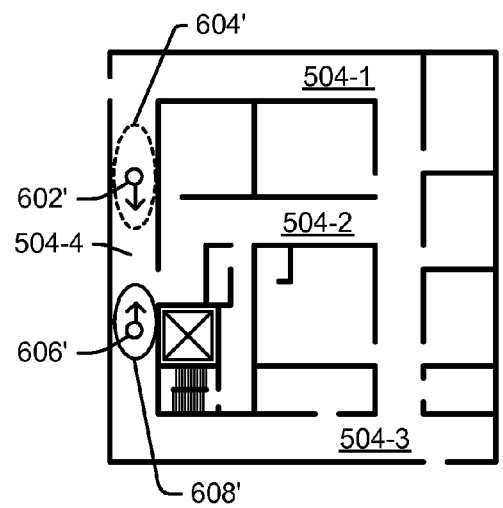

Attention is drawn next to FIG. 6A and FIG. 6B, which are illustrative diagrams similar to floor plan 500 (FIG. 5), and further illustrating an aspect of certain collaborative positioning and/or other like navigation capabilities with regard to two mobile devices being moved further apart over time within an example indoor environment, in accordance with an example implementation.

In FIG. 6A, a first mobile device is illustrated as having a position 602 in hallway 504-1 at a first point in time. For reference, a small arrow extends from position 602 to illustrate a trajectory or heading of the first mobile device. Here, for example, first mobile device is illustrated on the page is moving from the right-hand side to the left-hand side along horizontal hallway 504-1. A region 604 is intended to represent by way of illustration a particular level of uncertainty with regard to the determined position and/or movement of the first mobile device. Thus, for example, here at the first point in time, region 604 is illustrated as a fairly wide circle that encompasses portions of the surrounding rooms and even a portion outside of the indoor environment has mapped. A similar region 608, albeit much smaller in size, is intended to represent by way of illustration particular level of uncertainty with regard to the estimated position and/or movement of a second mobile device, at position 606, again at the first point in time. Hence by comparing the regions 604 and 608, it can be seen that there is a higher level of uncertainty with regard to the determined position and/or movement of the first mobile device then there is with regard to the position and/or movement of the second mobile device. Here, for example the second mobile device is illustrated at position 606, with its representative direction arrow showing that the second mobile device is moving along a hallway 504-4 in a direction generally towards 602 of the first mobile device. The region 608 of uncertainty illustrated for the second mobile device, while somewhat elongated is nonetheless within the applicable hallway 504-4.

In this example it is assumed that at the first point in time the first and second mobile devices may not be operatively collaborating in navigation, e.g., since neither of the devices appear to be within a threshold distance of one another to initiate and/or otherwise apply a proximity constraint, nor, in this example are either of the mobile devices illustrated as being collaboratively engage with one or more other mobile devices. It should be kept in mind however that if there are a significant number of mobile devices then there may be a variety of constraints that may be obtained and applied to one or more mobile devices from one or more of the other mobile devices, e.g. via shared navigation parameters.

Turning next to FIG. 6B, at a second point in time later than the first point in time, it can be seen that both the first and second mobile devices have continued on their paths and are now both located within the hallway 504-4. For example, the first mobile device is now located at position 602' and the second mobile device is now located at position 606'. It is assumed that the first and second mobile devices are now operatively engaged in collaborative navigation since it is assumed that the first and second mobile devices are located within a threshold distance of one another at this second point in time. Accordingly, as per the example process 400 in FIG. 4, it will be assumed that the first mobile device has obtained a navigation parameter indicative of an initial position and/or movement of the second mobile device and that a determined position and/or movement of the first mobile device has been affected based, at least in part, on the navigation parameter. Accordingly, a resulting region 604' of uncertainty with regard to the determined position and/or movement of the first mobile device has significantly reduced in size when compared to region 604 and FIG. 6A. As illustrated in FIG. 6B, region 604' no longer extends into other rooms or spaces and/or outside of the mapped space, but rather places the position of the first mobile device neatly within the confines of hallway 504-4. One reason for this reduction in uncertainty with regard to the determined position and/or movement of the first mobile device is that additional information/knowledge is now available (e.g., as obtained by the one or more navigation parameters) with regard to the second mobile devices position and/or movement which may be applied at least in part as a proximity constraint. Additionally, in certain example implementations, further constraints may be taken into account, such as a navigation constraint relating to one or more features in an electronic map and/or the like, and possibly, at times one or more active constraints based on a presence and/or absence of certain detectable user input and/or feedback, as previously described.

Similarly, as illustrated, uncertainty region 608' for the second mobile device at position 606' may also be reduced under certain circumstances the same or similar reasons, and particularly if one or more navigation parameters associated with the first mobile device are provided to or otherwise considered by the second mobile device.

In certain example implementations, at time t, a first mobile device may be located at position $p_1^t$ while a second mobile device may be located at position $p_2^t$. Here, by way of example, a position may be expressed with regard to some coordinate and/or other like reference system, e.g., using a multi-dimensional coordinate value(s) such as dimensions along x, y and possibly z axes, etc. A distance traveled by one of the mobile devices from time t to t+1 may be measured, for example, based, at least in part, on one or more signals generated by one or more onboard sensors.

Assuming, for example, that the two mobile devices have approximate position estimates $p_1^t$ and $p_2^t$ at time t. Certain approximate position and/or movement estimates may be obtained based, at least in part, on a last known position, detection and processing of a signal received from a WiFi hotspot, just to provide a couple of examples. At a later time, e.g., t+1, the first and second mobile devices may receive each others' transmissions (e.g., WiFi or Bluetooth transmissions) such that a range between the two devices at t+1 may be measured (e.g., from received signal strength or round-trip delay if the mobile devices are equipped to communicate peer-to-peer). The two mobile devices may also measure their displacements from time t to t+1, $d_1$ and $d_2$ by processing signals received from sensors (accelerometers, etc.). These measurements may enable establishing the following constraints:

$$p_1^{t+1} - p_1^t = d_1$$

$$p_2^{t+1} - p_2^t = d_2$$

$$p_2^{t+1} - p_1^{t+1} < \text{dist\_proximity}$$

Expressing a position in two-dimensions as indicated above provides five scalar constraints for eight unknowns. Given approximate positions, one may improve the position estimates using various constraints. For example, if one of the mobile devices has an accurate position (e.g., from WiFi), one may solve for the position of the other device at the instant the proximity was detected and also at the previous time instant.

In certain other example implementations, a proximity constraint (e.g., a measured range between mobile devices in an indoor environment at a time t) may be applied in determining and/or otherwise affecting a position and/or movement of a mobile device at a subsequent time (e.g., at a time t+1).

Figure 7A:
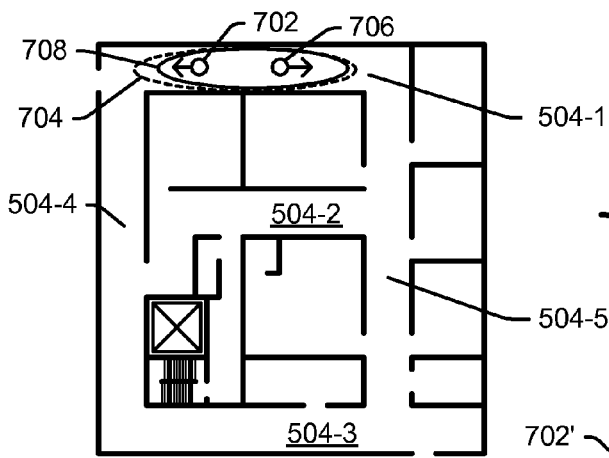
FIG. 7A, FIG. 7B and FIG. 7C are illustrative diagrams similar to FIG. 5, and further illustrating an aspect of certain collaborative positioning and/or other like navigation capabilities with regard to two mobile devices being moved further apart over time within the example indoor environment, in accordance with an example implementation.
Figure 7B:
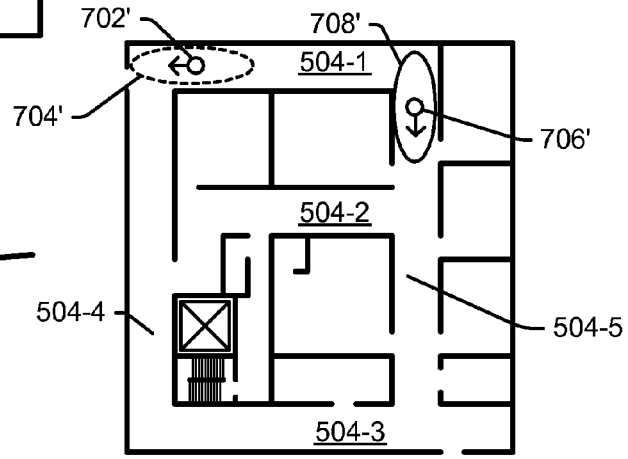
Figure 7C:
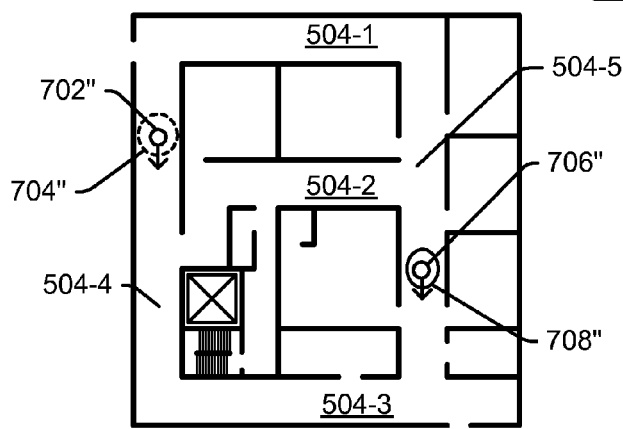

For example, attention is drawn next to FIG. 7A, FIG. 7B and FIG. 7C, which are illustrative diagrams similar to floor plan 500 (FIG. 5), and further illustrating an aspect of certain collaborative positioning and/or other like navigation capabilities with regard to a first mobile device and a second mobile device being moved further apart over time within the example indoor environment, in accordance with an example implementation.

In FIG. 7A, at an initial point in time, the first mobile device is at position 702 within hallway 504-1 and moving in a right to left direction as illustrated by its directional arrow and is associated with a relatively larger uncertainty region 704. The second mobile device is at position 706 within hallway 504-1 and moving in a left to right direction as illustrated by its directional arrow and is associated with a relatively smaller uncertainty region 708.

In FIG. 7B, at the subsequent point in time, the first mobile device has moved to position 702' within hallway 504-1 but is now associated with reduced uncertainty region 704', e.g. as a result of engaging in collaborative navigation with the second mobile device. The second mobile device has moved to position 706' within adjoining hallway 504-5 and is now moving in a top to bottom direction as illustrated by its directional arrow and is also associated with a reduced uncertainty region 708'.

In FIG. 7C, at an even later point in time, the first mobile device has moved to position 702" within adjoining hallway 504-4 and is now moving in a top to bottom direction as illustrated by its directional arrow. The first mobile device is now associated with an even greater reduced uncertainty region 704", as a result of continuing to engage in collaborative navigation with the second mobile device, and in light of the navigation constraints being identified as the first and second mobile device is navigate through the feasible regions of the indoor environment. The second mobile device has moved to position 706" within hallway 504-5, and is also associated with an even further reduced uncertainty region 708", as a result of the can and continued collaborative navigation with the first mobile device.

As illustrated in the preceding examples, in certain implementations, position and/or movement estimates may improve over time as additional navigation parameters are gathered and shared between mobile devices involved in a collaborative navigation. Various constraints may be applied between various mobile devices, such as certain proximity constraints, navigation constraints, and possibly active constraints. Further, in certain implementations, accuracy/precision may be further improved by having one or more of the mobile devices and/or possibly some other electronic device provisioned with an accurate and/or recent position fix (e.g., based on wireless positioning signals, SPS signals, human input) which may be involved in the collaborative navigation scheme.

Figure 8A:
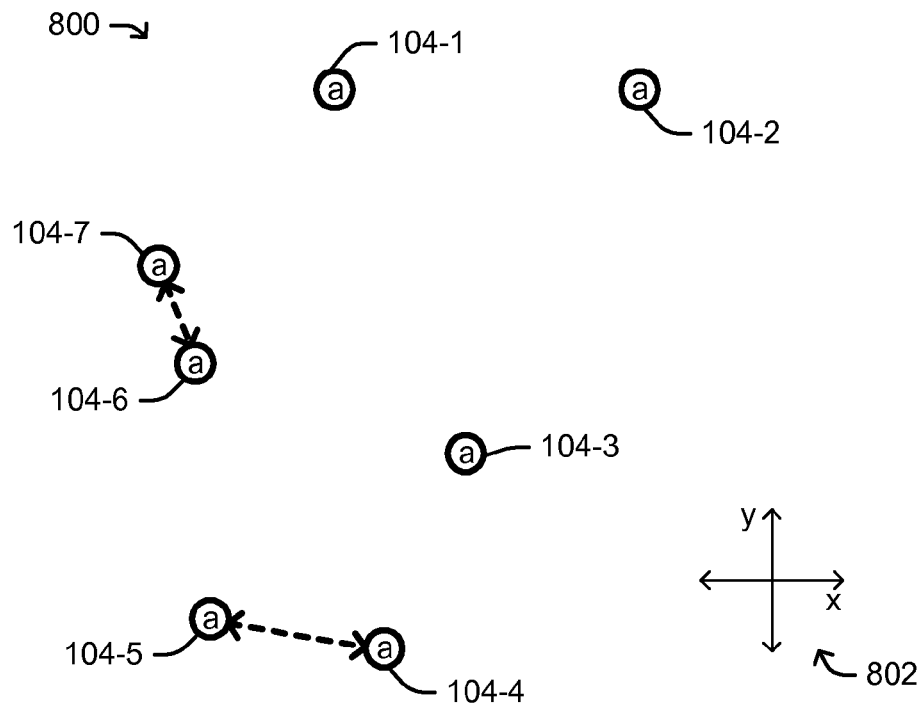
FIG. 8A, FIG. 8B and FIG. 8C are illustrative diagrams showing a graph of positions of mobile devices represented by nodes at various times as the position of certain mobile devices is affected, at least in part, based on certain detected or otherwise determinable constraints to movement that may be considered as part of certain collaborative positioning and/or other like navigation capabilities, in accordance with an example implementation.
Figure 8B:
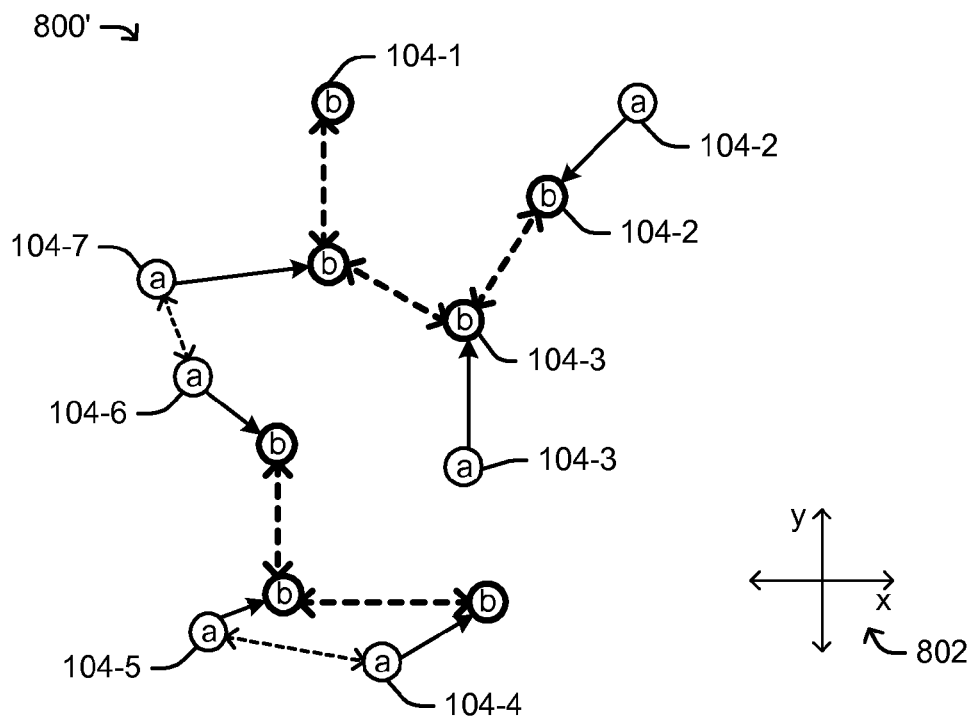
Figure 8C:
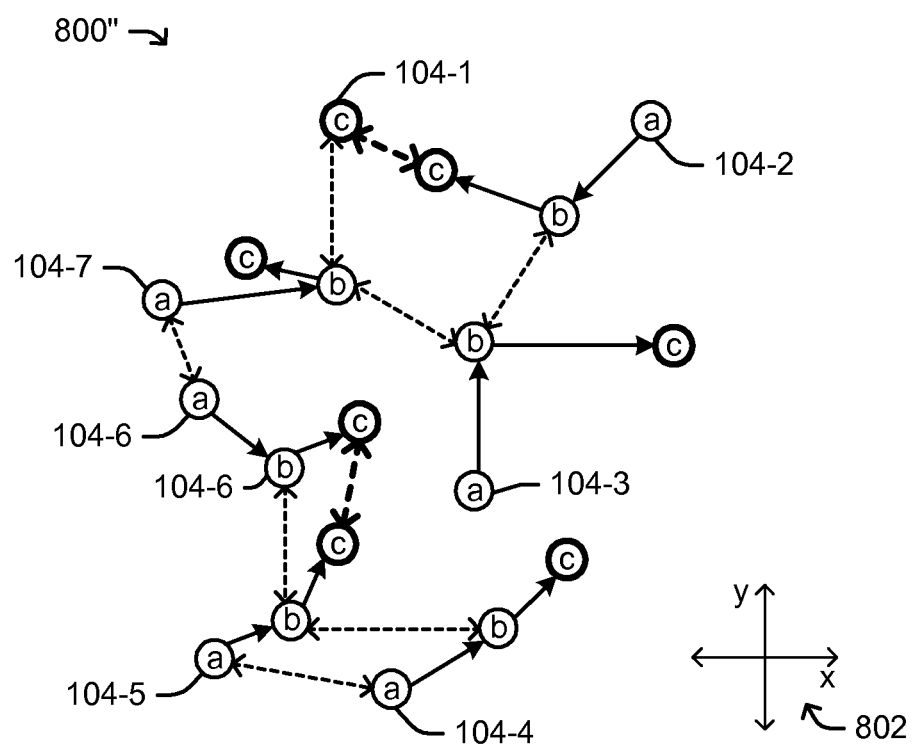

Attention is drawn next to FIG. 8A, FIG. 8B and FIG. 8C, which are illustrative diagrams showing in improving graph of positions of mobile devices represented by nodes at various times as the position of certain mobile devices is affected, at least in part, based on certain detected or otherwise determinable constraints to movement that may be considered as part of certain collaborative positioning and/or other like navigation capabilities, in accordance with an example implementation.

FIG. 8A illustrates the beginning of a graph 800 in which the position and/or movement of seven different mobile devices will be illustrated at two subsequent points in time in FIG. 8B and FIG. 8C.

As illustrated in graph 800 of FIG. 8A, the position of the mobile devices (nodes) are represented by circles at the first point in time which are each labeled by an "a". The initial positions of the mobile devices are labeled with reference numbers 104-1, 104-2, 104-3, 104-4, 104-5, 104-6, and 104-7. At this first point in time, as illustrated by the dashed interconnecting lines, a proximity constraint may be applied for mobile devices 104-4 and 104-5 since they are located within a threshold distance of one another. Similarly, a proximity constraint may be applied for mobile devices 104-6 and 104-7 since they too are located within a threshold distance of one another. As illustrated, an origin 802 is shown in this example to illustrate an example coordinate system with X and Y axes.

As illustrated in graph 800' of FIG. 8B, and a second point in time some of the mobile devices have moved and as such have navigation constraints (e.g., dead reckoning constraints based on their onboard sensors) which may be applied. Additionally, some of the mobile devices have moved to within a threshold distance of other mobile devices and hence a corresponding proximity constraint may be applied. Here, the position of the mobile devices (nodes) at the second point in time is again represented by circles labeled with a "b". A navigation constraint is illustrated by a solid line from the previous "a" node to the current "b" node.

With this in mind, mobile device 104-2 and mobile device 104-3 have each moved closer to one another gathering respective navigation constraints from their movements. As a result of their movements mobile device 104-2 and mobile device 104-3 are now within a threshold distance of one another, which as illustrated by the dashed line there between allows one or more of them to further consider a proximity constraint.

Similarly, mobile device 104-3 and mobile device 104-7 have each moved closer to one another gathering respective navigation constraints from their movements too, and are now within a threshold distance of one another, which as illustrated by the dashed line there between allows one or more of them to further consider a proximity constraint.

Mobile device 104-4 and mobile device 104-5 have each moved gathering respective navigation constraints from their movements, and remain within a threshold distance of one another, which as illustrated by the dashed line there between, allows one or more of them to again consider a timely proximity constraint.

Mobile device 104-5 and mobile device 104-6 have each moved closer to one another gathering respective navigation constraints from their movements. As a result of their movements, mobile device 104-5 and mobile device 104-6 are now within a threshold distance of one another, which as illustrated by the dashed line there between allows one or more of them to further consider a proximity constraint.

Mobile device 104-6 and mobile device 104-7 have each moved gathering respective navigation constraints from their movements, but have moved further away from one another, and hence no longer have a timely proximity constraint to consider, although the previous proximity constraint may still be taken into consideration in certain implementations.

In this example, mobile device 104-1 has not moved. However, mobile device 104-7 has moved and gathered navigation constraints based on its movements, which have also brought mobile device 104-7 to within a threshold distance of mobile device 104-1. Hence, as illustrated by the dashed line between mobile device 104-7 and mobile device 104-1, mobile devices 104-7 and 104-1 may take a proximity constraint into consideration.

As illustrated in graph 800" of FIG. 8C, at a third point in time, some of the mobile devices have again moved and as such have navigation constraints (e.g., dead reckoning constraints based on their onboard sensors) which may be applied. Additionally, some of the mobile devices have moved to within a threshold distance of other mobile devices and hence a timely corresponding proximity constraint may be applied. Here, the position of the mobile devices (nodes) at the third point in time is represented by circles labeled with a "c". A navigation constraint is illustrated by solid line from the previous "b" node to the current "c" node. Proximity constraints are illustrated by dashed lines.

Here again, in this example, mobile device 104-1 has not itself moved. However, mobile device 104-2 has moved to within a threshold distance of mobile device 104-1 and hence, as illustrated by the dashed line there between, a new proximity constraint may be considered by these mobile devices. Conversely, however, mobile device 104-7 has moved away from mobile device 104-1, and there is no additional proximity constraint there between Mobile devices 104-3 and 104-4 have each moved, but in directions mostly away from the other mobile devices and hence, no further proximity constraints are available to be applied by these mobile devices.

Mobile device 104-5 and mobile device 104-6 have moved even closer together, which again allows one or more of them to consider a timely proximity constraint, as illustrated by the dashed line there between.

Thus, as illustrated by the preceding examples, collaborative navigation schemes may be of particular benefit in indoor environments wherein said wireless positioning signals may not be available. Moreover, through the sharing of various navigation parameters, a plurality of mobile devices may improve their own positions/movement estimations by taking into account certain navigation parameters and applying certain constraints to their own positions and/or movements based thereon.

In accordance with certain implementations, a collaborative navigation scheme may take into account a proximity constraint which may be triggered by mobile devices moving into a threshold distance of one another. Additionally, various navigation constraints may be applied which may be based on sensed movements of the mobile devices and/or based on other features that may be identified in an electronic map and/or other like information for an indoor environment. Further still, in certain implementations, certain active constraints may be solicited and/or otherwise received based on detectable user inputs and/or other like feedback, which at times may provide specifically beneficial information to prove the position and/or movement estimates of one or more of the mobile devices.

In accordance with certain implementations, a collaborative navigation scheme may take the form of a mobile centric positioning scheme in which one or more navigation parameters may be shared directly between mobile devices and/or otherwise broadcaster passed around through a series of mobile devices.

In accordance with certain other implementations, a collaborative navigation scheme may take the form of a network-based positioning scheme in which one or more computing devices and/or other like electronic devices may support the sharing of navigation parameters between mobile devices, and/or may perform certain processes that may be of benefit to one or more of the mobile devices.

In accordance with certain other implementations, a collaborative navigation scheme may allow for certain mobile devices to obtain navigation parameters from one or more other devices, and to possibly substitute such information for its own, e.g., which may allow for improved performance, improved power management, etc.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for performing collaborative navigation, at a first mobile device, between said first mobile device and a second mobile device, the method comprising:
   receiving a signal, from said second mobile device, at said first mobile device;
   determining, based on a measurement characteristic of said signal received at said first mobile device, that a second mobile device is located less than at a threshold distance from said first mobile device;
   obtaining, at a communication interface, navigation parameter indicative of an initial position of said second mobile device or a movement of said second mobile device, said initial position of said second mobile device or a movement of said second mobile device being determined based, at least in part, on a measurement from a sensor at said second mobile device; and
   determining an estimated position of said first mobile device, using said navigation parameter, one or more navigation constraints identified in an electronic map corresponding to an indoor environment, and said threshold distance between said second mobile device and said first mobile device, to limit said estimated position, movement determination, or both of said first mobile device within said indoor environment.

2. The method as recited in claim 1, and further comprising, at said first mobile device:
   calculating an initial uncertainty level of said first mobile device's initial position; and
   calculating a subsequent uncertainty level of said first mobile device's estimated position, wherein said subsequent uncertainty level is reduced in size as compared to said initial uncertainty level due to said limiting of the estimated position by said navigation parameter and said one or more navigation constraints identified in said electronic map.

3. The method as recited in claim 1, and further comprising, with said first mobile device:
   obtaining, via said communication interface, a subsequent navigation parameter indicative of a subsequent position of said second mobile device or said movement of said second mobile device;
   determining a subsequent estimated position of said first mobile device, using said subsequent navigation parameter, said one or more navigation constraints identified in said electronic map corresponding to said indoor environment, and said threshold distance between said first mobile device and said second mobile device to further limit said subsequent estimated position, movement determination, or both of said first mobile device within said indoor environment.

4. The method as recited in claim 3, wherein said navigation parameter is obtained by said first mobile device directly from said second mobile device and said subsequent navigation parameter is obtained by said first mobile device from said second indirectly via another electronic device.

5. The method as recited in claim 1, and further comprising, with said first mobile device:
   obtaining, at said communication interface, another navigation parameter indicative of a position or a movement of a third mobile device for performing collaborative navigation with said first mobile device and said third mobile device; and
   determining said estimated position of said first mobile device using said another navigation parameter to further limit said estimated position, movement determination, or both of said first mobile device within said indoor environment.

6. The method as recited in claim 5, wherein said position or said movement of said third mobile device is based, at least in part, on a position fix.

7. The method as recited in claim 1, wherein said electronic map comprises a floor plan, a connectivity map or a routability graph, or combination thereof.

8. The method as recited in claim 1, and further comprising, at said first mobile device:
   determining an active constraint based, at least in part, on a presence or absence of a detectable user action input via an input unit or a sensor, or combination thereof; and
   determining said estimated position of said first mobile device, using said active constraint to further limit said estimated position, movement determination, or both of said first mobile device within said indoor environment.

9. The method as recited in claim 8, said active constraint further comprises:
   initiating a presentation of a solicitation for said detectable user action via an output device provisioned in said first mobile device.

10. The method as recited in claim 9, wherein said solicitation for said detectable user action is based, at least in part, on at least said one or more navigation constraints identified within said electronic map.

11. The method as recited in claim 1, further comprising:
    limiting said estimated position or said movement determination, or combination thereof, of said first mobile device further based, at least in part, on:
       an odometry measurement for at least one of said plurality of mobile devices.

12. The method as recited in claim 1, and further comprising:
    limiting said estimated position or said movement determination of said first mobile device further based, at least in part, on:
       an operable communications range measurement from said first mobile device to another electronic device applied as a proximity constraint to a movement of said first mobile device over time;

or a presence or absence of a detectable user action input via an input unit or a sensor, or combination thereof, at said first mobile device applied as an active constraint to said movement of said first mobile device over time, or combination thereof.

13. The method as recited in claim 1, and further comprising, with said first mobile device:

transmitting, via a transmitter, a local navigation parameter to at least said second mobile device, said local navigation parameter being indicative of at least one of an initial estimated position or a movement of said first mobile device, or said estimated position or said movement of said first mobile device.

14. The method as recited in claim 13, wherein transmitting said local navigation parameter to at least said second mobile device further comprises:

transmitting, via said transmitter, said local navigation parameter to at least said second mobile device via another electronic device.

15. The method as recited in claim 1, wherein said threshold distance is based, at least in part, on at least a proximity constraint corresponding to an operable communication range of a first radio provisioned in said first mobile device and a second radio provisioned in said second mobile device.

16. The method as recited in claim 15, wherein said operable communication range comprises a wireless personal area network (WPAN) range for a WPAN using at least one of said first radio or said second radio.

17. The method as recited in claim 1, said initial position or said movement of said second mobile device being further determined based, at least in part, on an odometry measurement obtained from an accelerometer.

18. The method as recited in claim 1, wherein said obtained navigation parameter indicative of said initial position or said movement of said second mobile device is obtained from said second mobile device via another electronic device.

19. The method as recited in claim 18, wherein said obtained navigation parameter indicative of said initial position or said movement of said second mobile device is determined, at least in part, by said another electronic device.

20. The method as recited in claim 1, and further comprising, with said first mobile device:

obtaining said determination that at least said second mobile device is located within said threshold distance of said first mobile device from another electronic device.

21. The method as recited in claim 1, and further comprising, with said first mobile device:

using said navigation parameter, at least in part, as a substitute for a local navigation parameter indicative of an estimated position or said movement of said first mobile device, wherein said local navigation parameter is based, at least in part, on a local sensor at said first mobile device.

22. The method as recited in claim 21, and further comprising, with said first mobile device:

abstaining from determining said local navigation parameter based, at least in part, on an expectation that said navigation parameter as obtained, or at least one other navigation parameter yet to be obtained, is usable as said substitute for said local navigation parameter.

23. The method as recited in claim 1, wherein said navigation parameter comprises at least one of: an odometry measurement, a relative position measurement, a velocity measurement, a position coordinate, a trajectory measurement, a heading measurement, a pseudorange, an inertial measurement, a height measurement, an indication of position and/or movement accuracy, a positioning resource identifier, or a timestamp.

24. An apparatus for use in a first mobile device in performing collaborative navigation between a first mobile device and a second mobile device, the apparatus comprising:

means for receiving a signal, from said second mobile device, at said first mobile device;

means for determining, based on a measurement characteristic of said signal received at said first mobile device that a second mobile device is located less than a threshold distance from said first mobile device means for obtaining, at a communication interface, a navigation parameter indicative of an initial position of said second mobile device or said movement of said second mobile device, said initial position of said second mobile device or said movement of said second mobile device being determined based, at least in part, on a measurement from a sensor at said second mobile device; and means for determining an estimated position of said first mobile device, using said navigation parameter, one or more navigation constraints identified in an electronic map corresponding to an indoor environment, and said threshold distance between said second mobile device and said first mobile device to limit said estimated position, movement determination, or both of said first mobile device within said indoor environment.

25. The apparatus as recited in claim 24, and further comprising:

means for calculating an initial uncertainty level of said first mobile device's initial position; and means for calculating a subsequent uncertainty level of said first mobile device's estimated position, wherein said subsequent uncertainty level is reduced in size as compared to said initial uncertainty level due to said limiting of the estimated position by said navigation parameter and said one or more navigation constraints identified in said electronic map.

26. The apparatus as recited in claim 24, and further comprising:

means for obtaining, via said means for receiving a signal, a subsequent navigation parameter indicative of a subsequent position of said second mobile device or said movement of said second mobile device;

and means for determining a subsequent estimated position of said first mobile device, using said subsequent navigation parameter, said one or more navigation constraints identified in said electronic map corresponding to said indoor environment, and said threshold distance between said first mobile device and said second mobile device to further limit said subsequent estimated position, movement determination, or both of said first mobile device in said indoor environment.

27. The apparatus as recited in claim 26, wherein said navigation parameter is obtained by said first mobile device directly from said second mobile device and said subsequent navigation parameter is obtained by said first mobile device from said second indirectly via another electronic device.

28. The apparatus as recited in claim 24, and further comprising:
   means for obtaining, at said communication interface, another navigation parameter indicative of a position and/or movement of a third mobile device for performing collaborative navigation with said first mobile device and said third mobile device; and
   means for determining said estimated position of said first mobile device using said another navigation parameter to further limit said estimated position, movement determination, or both of said first mobile device in said indoor environment.

29. The apparatus as recited in claim 28, wherein said position or said movement of said third mobile device is based, at least in part, on a position fix.

30. The apparatus as recited in claim 24, wherein said electronic map comprises a floor plan, a connectivity map or a routability graph, or combination thereof.

31. The apparatus as recited in claim 24, and further comprising:
   means for determining an active constraint based, at least in part, on a presence or absence of a detectable user action input via an input unit or a sensor, or combination thereof; and
   means for determining said estimated position of said first mobile device, using said active constraint to further limit said estimated position, movement determination, or both of said first mobile device in said indoor environment.

32. The apparatus as recited in claim 31, and further comprising:
   means for presenting a solicitation for said detectable user action.

33. The apparatus as recited in claim 32, wherein said solicitation for said detectable user action is based, at least in part, on said one or more navigation constraints identified within said electronic map.

34. The apparatus as recited in claim 24, and further comprising:
   means for limiting said estimated position, said movement determination, or a combination thereof, of said first mobile device is further based, at least in part on:
   an odometry measurement for at least one of said plurality of mobile devices.

35. The apparatus as recited in claim 24, and further comprising:
   means for limiting said estimated position or said movement determination of said first mobile device is further based, at least in part, on:
   an operable communication range measurement from said first mobile device to another electronic device applied as a proximity constraint to a movement of said first mobile device over time;
   or
   a presence or absence of a detectable user action input via an input unit or a sensor, or combination thereof, at said first mobile device applied as an active constraint to said movement of said first mobile device over time, or combination thereof.

36. The apparatus as recited in claim 24, and further comprising:
   means for transmitting, via a transmitter, a local navigation parameter to at least said second mobile device, said local navigation parameter being indicative of at least one of an initial estimated position or an movement of said first mobile device, or said estimated position or said movement of said first mobile device.

37. The apparatus as recited in claim 36, and further comprising:
   means for transmitting, via said transmitter, said local navigation parameter to at least said second mobile device via another electronic device.

38. The apparatus as recited in claim 24, wherein said threshold distance is based, at least in part, on at least a proximity constraint corresponding to an operable communication range of a first radio provisioned in said first mobile device and a second radio provisioned in said second mobile device.

39. The apparatus as recited in claim 38, wherein said operable communication range comprises a wireless personal area network (WPAN) range for a WPAN using at least one of said first radio or said second radio.

40. The apparatus as recited in claim 24, said initial position or said movement of said second mobile device being further determined based, at least in part, on an odometry measurement obtained from an accelerometer.

41. The apparatus as recited in claim 24, wherein said obtained navigation parameter indicative of said initial position or said movement of said second mobile device is obtained from said second mobile device via another electronic device.

42. The apparatus as recited in claim 41, wherein said obtained navigation parameter indicative of said position or said movement of said second mobile device is determined, at least in part, by said another electronic device.

43. The apparatus as recited in claim 24, and further comprising:
   means for obtaining said determination that at least said second mobile device is located within said threshold distance of said first mobile device from another electronic device.

44. The apparatus as recited in claim 24, and further comprising:
   means for using said navigation parameter, at least in part, as a substitute for a local navigation parameter indicative of an estimated position or said movement of said first mobile device, wherein said local navigation parameter is based, at least in part, on a local sensor at said first mobile device.

45. The apparatus as recited in claim 44, and further comprising:
   means for indicating to at least one process to abstain from determining said local navigation parameter based, at least in part, on an expectation that said navigation parameter as obtained, or at least one other navigation parameter yet to be obtained, is usable as said substitute for said local navigation parameter.

46. A computing platform at a first mobile device to perform collaborative navigation between a a first mobile device and a second mobile device, the computing platform comprising:
   a communication interface;
   one or more non-transitory memories; and
   a processing unit, connected to and being used in conjunction with said communication interface and said one or more non-transitory memories, and configured to:
      receive a signal, from said second mobile device, at said first mobile device;
      determine, based on a measurement characteristic of a signal received at said first mobile device, that said second mobile device is located less than a threshold distance from said first mobile device;

obtain, at said communication interface, a navigation parameter indicative of an initial position of said second mobile device or movement of said second mobile device, said initial position of said second mobile device or said movement of said second mobile device being determined based, at least in part, on a measurement from a sensor at said second mobile device; and determine an estimated position of said first mobile device using said navigation parameter, one or more navigation constraints identified in an electronic map corresponding to an indoor environment, and said threshold distance between said second mobile device and said first mobile device to limit said estimated position, said movement determination, or both of said first mobile device within said indoor environment.

47. The computing platform as recited in claim 46, said processing unit configured to further:
calculate an initial uncertainty level of said first mobile device's initial position; and
calculate a subsequent uncertainty level of said first mobile device's estimated position, wherein said subsequent uncertainty level is reduced in size as compared to said initial uncertainty level due to said limiting of the estimated position by said navigation parameter and said one or more navigation constraints identified in said electronic map.

48. The computing platform as recited in claim 46, said processing unit configured to further:
obtain, via said communication interface, a subsequent navigation parameter indicative of a subsequent position of said second mobile device or said movement of said second mobile device;
determining an estimated position of said first mobile device using said subsequent navigation parameter, said one or more navigation constraints identified in said electronic map corresponding to said indoor region, and said threshold distance between said first mobile device and said second mobile device to further limit said estimated position, said movement determination, or both of said first mobile device within said indoor environment.

49. The computing platform as recited in claim 48, wherein said navigation parameter is obtained by said first mobile device directly from said second mobile device and said subsequent navigation parameter is obtained by said first mobile device from said second indirectly via another electronic device.

50. The computing platform as recited in claim 46, said processing unit to further:
obtain, via said communication interface, another navigation parameter indicative of a position of a third mobile device and/or movement of a third mobile device for performing collaborative navigation with said first mobile device and said third mobile device; and
determine said estimated position of said first mobile device using said navigation parameter to further limit said estimated position, said movement determination, or both of said first mobile device within said indoor environment.

51. The computing platform as recited in claim 50, wherein said position or said movement of said third mobile device is based, at least in part, on a position fix.

52. The computing platform as recited in claim 46, wherein said electronic map comprises at a floor plan, a connectivity map or a routability graph, or combination thereof.

53. The computing platform as recited in claim 46, and further comprising:
a sensor or an input device, or combination thereof; and
said processing unit configured to further:
determine an active constraint based, at least in part, on a presence or absence of a detectable user action based, at least in part, on said sensor or said input device, or combination thereof; and
determine said estimated position of said first mobile device, using said active constraint to further limit said estimated position, said movement, or both of said first mobile device within said indoor environment.

54. The computing platform as recited in claim 53, further comprising:
an output device; and
said processing unit configured to further:
initiate a presentation of a solicitation for said detectable user action via said output device provisioned in said first mobile device.

55. The computing platform as recited in claim 54, wherein said solicitation for said detectable user action is based, at least in part, on said one or more navigation constraints identified within said electronic map.

56. The computing platform as recited in claim 46, said processing unit configured to further:
limit said estimated position or said movement determination, or a combination thereof, of said first mobile device further based, at least in part, on:
an odometry measurement for at least one of said plurality of mobile devices.

57. The computing platform as recited in claim 46, said processing unit configured to further:
limit said estimated position or said movement determination of said first mobile device further based, at least in part, on:
an operable communication range measurement from said first mobile device to another electronic device applied as a proximity constraint to a movement of said first mobile device over time;
or
a presence or absence of a detectable user action input at an input unit or a sensor, or combination thereof, at said first mobile device applied as an active constraint to said movement of said first mobile device over time, or combination thereof.

58. The computing platform as recited in claim 46, said processing unit configured to further:
initiate transmission of a local navigation parameter to at least said second mobile device, via a transmitter, said local navigation parameter being indicative of at least one of an initial estimated position or an movement of said first mobile device, or said estimated position or said movement of said first mobile device.

59. The computing platform as recited in claim 58, said processing unit configured to further:
initiate transmission of said local navigation parameter to at least said second mobile device, via said transmitter and another electronic device.

60. The computing platform as recited in claim 46, wherein said threshold distance is based, at least in part, on at least a proximity constraint corresponding to an operable communication range of a first radio provisioned in said first mobile device and a second radio provisioned in said second mobile device.

61. The computing platform as recited in claim 60, wherein said operable communication range comprises a wireless personal area network (WPAN) range for a WPAN using at least one of said first radio or said second radio.

62. The computing platform as recited in claim 46, said initial position or said movement of said second mobile device being further determined based, at least in part, on an odometry measurement obtained from an accelerometer.

63. The computing platform as recited in claim 46, wherein said navigation parameter indicative of said initial position or said movement of said second mobile device is obtained from said second mobile device via said communication interface and another electronic device.

64. The computing platform as recited in claim 63, wherein said obtained navigation parameter indicative of said initial position or said movement of said second mobile device is determined, at least in part, by said another electronic device.

65. The computing platform as recited in claim 46, said processing unit configured to further:
obtain said determination that at least said second mobile device is located within said threshold distance of said first mobile device from another electronic device, via said communication interface.

66. The computing platform as recited in claim 46, said processing unit configured to further:
use said navigation parameter, at least in part, as a substitute for a local navigation parameter indicative of an estimated position or said movement of said first mobile device, wherein said local navigation parameter is based, at least in part, on a local sensor at said first mobile device.

67. The computing platform as recited in claim 66, said processing unit configured to further:
indicate to at least one process to abstain from determining said local navigation parameter based, at least in part, on an expectation that said navigation parameter as obtained, or at least one other navigation parameter yet to be obtained, is usable as said substitute for said local navigation parameter.

68. An article for use in a first mobile device capable of performing collaborative navigation between a plurality of mobile devices, the article comprising a non-transitory computer readable medium having stored there in computer implementable instructions executable by a processing unit in said first mobile device to:
receive a signal, from said second mobile device, at said first mobile device;
determine, based on a measurement characteristic of a signal received at said first mobile device and transmitted from said second mobile device that a second mobile device is located less than a threshold distance from said first mobile device;
obtain, at a communication interface, a navigation parameter indicative of an initial position of said second mobile device or movement of said second mobile device, said initial position of said second mobile device or said movement of said second mobile device being determined based, at least in part, on a sensor at said second mobile device; and
determine an estimated position of said first mobile device, using said navigation parameter, one or more navigation constraints identified in an electronic map corresponding to an indoor environment, and said threshold distance between said second mobile device and said first mobile device to limit an estimated position, movement determination, or both of said first mobile device within said indoor environment.

69. The article as recited in claim 68, said computer implementable instructions being further executable by said processing unit to:
calculate an initial uncertainty level of said first mobile device's initial position; and
calculate a subsequent uncertainty level of said first mobile device's estimated position, wherein said subsequent uncertainty level is reduced in size as compared to said initial uncertainty level due to said limiting of the estimated position by said navigation parameter and said one or more navigation constraints identified in said electronic map.

70. The article as recited in claim 68, said computer implementable instructions being further executable by said processing unit to:
obtain, via a receiver, a subsequent navigation parameter indicative of a subsequent position of said second mobile device or said movement of said second mobile device; and
determine a subsequent estimated position of said first mobile device, using said subsequent navigation parameter, said one or more navigation constraints identified in said electronic map corresponding to said indoor environment, and said threshold distance between said first mobile device and said second mobile device to limit said estimated position, movement determination, or both of said first mobile device within said indoor environment.

71. The article as recited in claim 70, wherein said navigation parameter is obtained by said first mobile device directly from said second mobile device and said subsequent navigation parameter is obtained by said first mobile device from said second indirectly via another electronic device.

72. The article as recited in claim 68, said computer implementable instructions being further executable by said processing unit to:
obtain, via said communication interface, another navigation parameter indicative of a position of a third mobile device or movement of said third mobile device for performing collaborative navigation with said first mobile device and said third mobile device; and
determine said estimated position of said first mobile device using said another navigation parameter to further limit said estimated position, movement determination, or both of said first mobile device within said indoor environment.

73. The article as recited in claim 72, wherein said position or said movement of said third mobile device is based, at least in part, on a position fix.

74. The article as recited in claim 68, wherein said electronic map comprises a floor plan, a connectivity map or a routability graph, or combination thereof.

75. The article as recited in claim 68, said computer implementable instructions being further executable by said processing unit to:
determine an active constraint based, at least in part, on a presence or absence of a detectable user action input via an input unit or a sensor, or combination thereof; and
determine said estimated position of said first mobile device, using said active constraint to further limit said estimated position, said movement determination, or both of said first mobile device within said indoor environment.

76. The article as recited in claim 75, said computer implementable instructions being further executable by said processing unit to:
initiate a presentation of a solicitation for said detectable user action via an output device provisioned in said first mobile device.

77. The article as recited in claim 76, wherein said solicitation for said detectable user action is based, at least in part, on said one or more navigation constraints identified within said electronic map.

78. The article as recited in claim 68, said computer implementable instructions being further executable by said processing unit to:
limit said estimated position or said movement determination, or a combination thereof, of said first mobile device further based, at least in part, on:
an odometry measurement for at least one of said plurality of mobile devices.

79. The article as recited in claim 68, said computer implementable instructions being further executable by said processing unit to:
limit said estimated position or said movement determination of said first mobile device further based, at least in part, on:
an operable communication range measurement from said first mobile device to another electronic device applied as a proximity constraint to a movement of said first mobile device over time;
or
a presence or absence of a detectable user action input at an input unit or a sensor, or combination thereof, at said first mobile device applied as an active constraint to said movement of said first mobile device over time, or combination thereof.

80. The article as recited in claim 68, said computer implementable instructions being further executable by said processing unit to:
initiate transmission of a local navigation parameter via a transmitter to at least said second mobile device, said local navigation parameter being indicative of at least one of an initial estimated position or said movement of said first mobile device, or said estimated position or said movement of said first mobile device.

81. The article as recited in claim 80, said computer implementable instructions being further executable by said processing unit to:
initiate transmission of said local navigation parameter via said transmitter to at least said second mobile device via another electronic device.

82. The article as recited in claim 81, wherein said navigation parameter indicative of said initial position or said movement of said second mobile device is determined, at least in part, by said another electronic device.

83. The article as recited in claim 68, wherein said threshold distance is based, at least in part, on at least a proximity constraint corresponding to an operable communication range of a first radio provisioned in said first mobile device and a second radio provisioned in said second mobile device.

84. The article as recited in claim 83, wherein said operable communication range comprises a wireless personal area network (WPAN) range for a WPAN using at least one of said first radio or said second radio.

85. The article as recited in claim 68, said initial position or said movement of said second mobile device being further determined based, at least in part, on an odometry measurement obtained from an accelerometer.

86. The article as recited in claim 68, wherein said obtained navigation parameter indicative of said initial position or said movement of said second mobile device is obtained from said second mobile device via another electronic device.

87. The article as recited in claim 68, said computer implementable instructions being further executable by said processing unit to:
obtain said determination that at least said second mobile device is located within said threshold distance of said first mobile device from another electronic device.

88. The article as recited in claim 68, said computer implementable instructions being further executable by said processing unit to:
use said navigation parameter, at least in part, as a substitute for a local navigation parameter indicative of an estimated position or said movement of said first mobile device, wherein said local navigation parameter is based, at least in part, on a local sensor at said first mobile device.

89. The article as recited in claim 88, said computer implementable instructions being further executable by said processing unit to:
indicate to at least one process to abstain from determining said local navigation parameter based, at least in part, on an expectation that said navigation parameter as obtained, or at least one other navigation parameter yet to be obtained, is usable as said substitute for said local navigation parameter.

90. The method as recited in claim 1, wherein said estimated position or said movement determination of said first mobile device is constrained to be within said threshold distance from said second mobile device.

91. The apparatus as recited in claim 24, wherein said estimated position or said movement determination of said first mobile device is constrained to be within said threshold distance from said second mobile device.

92. The computing platform as recited in claim 46, wherein said estimated position or said movement determination of said first mobile device is constrained to be within said threshold distance from said second mobile device.

93. The article as recited in claim 68, wherein said estimated position or said movement determination of said first mobile device is constrained to be within said threshold distance from said second mobile device.

* * * * *